United States Patent [19]
Erickson

[11] Patent Number: 6,080,216
[45] Date of Patent: Jun. 27, 2000

[54] LAYERED ALUMINA-BASED ABRASIVE GRIT, ABRASIVE PRODUCTS, AND METHODS

[75] Inventor: Dwight D. Erickson, Oakdale, Minn.

[73] Assignee: 3M Innovative Properties Company, St. Paul, Minn.

[21] Appl. No.: 09/064,491

[22] Filed: Apr. 22, 1998

[51] Int. Cl.$^7$ .................................................. C09C 1/68
[52] U.S. Cl. .......................... 51/309; 51/307; 428/403; 428/404; 501/127
[58] Field of Search .......................... 51/293, 297, 309, 51/307; 501/95.1, 127, 153, 12; 428/373, 689, 698, 699, 403, 404; 264/621, 623

[56] References Cited

U.S. PATENT DOCUMENTS

| | | | |
|---|---|---|---|
| 2,127,504 | 8/1938 | Derr et al. | 23/143 |
| 2,958,593 | 11/1960 | Hoover et al. | 51/295 |
| 3,340,205 | 9/1967 | Hayes et al. | 252/313 |
| 3,957,598 | 5/1976 | Merkl | 204/72 |
| 4,252,544 | 2/1981 | Takahashi | 51/309 |
| 4,278,449 | 7/1981 | Helletsberger et al. | 51/309 |
| 4,311,489 | 1/1982 | Kressner | 51/298 |
| 4,314,827 | 2/1982 | Leitheiser et al. | 51/298 |
| 4,574,003 | 3/1986 | Gerk | 51/309 |
| 4,623,364 | 11/1986 | Cottringer et al. | 51/309 |
| 4,652,275 | 3/1987 | Bloecher et al. | 51/295 |
| 4,707,399 | 11/1987 | Rambosek | 428/225 |
| 4,734,104 | 3/1988 | Broberg | 51/295 |
| 4,737,163 | 4/1988 | Larkey | 51/295 |
| 4,744,802 | 5/1988 | Schwabel | 51/309 |
| 4,770,671 | 9/1988 | Monroe et al. | 51/293 |
| 4,797,378 | 1/1989 | Sowman | 501/95 |
| 4,798,814 | 1/1989 | Everitt et al. | 501/89 |
| 4,799,939 | 1/1989 | Bloecher et al. | 51/293 |
| 4,824,623 | 4/1989 | Rambosek | 264/60 |
| 4,848,041 | 7/1989 | Kruschke | 51/309 |
| 4,881,951 | 11/1989 | Wood et al. | 51/309 |
| 4,929,578 | 5/1990 | Sowman | 501/95 |
| 4,964,883 | 10/1990 | Morris et al. | 51/293 |
| 4,997,461 | 3/1991 | Markhoff-Matheny et al. | 51/295 |
| 5,009,676 | 4/1991 | Rue et al. | 51/309 |
| 5,011,508 | 4/1991 | Wald et al. | 51/293 |
| 5,017,316 | 5/1991 | Sowman | 264/60 |
| 5,035,723 | 7/1991 | Kalinowski et al. | 51/309 |
| 5,090,968 | 2/1992 | Pellow | 51/293 |
| 5,103,598 | 4/1992 | Kelly | 51/295 |
| 5,129,919 | 7/1992 | Kalinowski et al. | 51/309 |
| 5,152,917 | 10/1992 | Pieper et al. | 51/295 |
| 5,163,975 | 11/1992 | Martin | 51/293 |
| 5,164,348 | 11/1992 | Wood | 501/127 |
| 5,185,012 | 2/1993 | Kelly | 51/295 |
| 5,194,072 | 3/1993 | Rue et al. | 51/309 |
| 5,201,916 | 4/1993 | Berg et al. | 51/293 |
| 5,213,591 | 5/1993 | Celikkaya et al. | 51/293 |
| 5,215,552 | 6/1993 | Sung | 51/293 |
| 5,219,806 | 6/1993 | Wood | 501/127 |
| 5,224,970 | 7/1993 | Harakawa et al. | 51/298 |
| 5,227,104 | 7/1993 | Bauer | 264/56 |
| 5,244,477 | 9/1993 | Rue et al. | 51/293 |
| 5,312,789 | 5/1994 | Wood | 501/127 |
| 5,316,812 | 5/1994 | Stout et al. | 428/64 |
| 5,372,620 | 12/1994 | Rowse et al. | 51/309 |
| 5,429,647 | 7/1995 | Larmie | 51/295 |
| 5,435,816 | 7/1995 | Spurgeon et al. | 51/295 |
| 5,443,906 | 8/1995 | Pihl et al. | 428/373 |
| 5,474,583 | 12/1995 | Celikkaya | 51/309 |
| 5,489,204 | 2/1996 | Conwell et al. | 432/153 |
| 5,505,747 | 4/1996 | Chesley et al. | 51/297 |
| 5,551,963 | 9/1996 | Larmie | 51/307 |
| 5,573,619 | 11/1996 | Benedict et al. | 156/137 |
| 5,611,828 | 3/1997 | Celikkaya | 51/309 |
| 5,628,806 | 5/1997 | Celikkaya et al. | 51/309 |
| 5,641,330 | 6/1997 | Celikkaya et al. | 51/309 |
| 5,679,067 | 10/1997 | Johnson et al. | 451/527 |
| 5,690,707 | 11/1997 | Wood et al. | 51/309 |

FOREIGN PATENT DOCUMENTS

| | | | |
|---|---|---|---|
| 0 272 197 A2 | 6/1988 | European Pat. Off. | B22F 1/02 |
| 0 360 590 A1 | 3/1990 | European Pat. Off. | B28B 3/20 |
| 0 426 138 A2 | 5/1991 | European Pat. Off. | B24D 3/00 |
| 1139258 | 1/1969 | United Kingdom | C08F 47/00 |
| 0 620 082 A1 | 10/1994 | WIPO | B24D 3/06 |
| WO 94/22559 | 10/1994 | WIPO | B01D 51/08 |
| WO 96/33638 | 10/1996 | WIPO | A46B 1/00 |
| WO 97/07937 | 3/1997 | WIPO | B24D 11/00 |

OTHER PUBLICATIONS

Brady et al., "Forming Textured Ceramics By Multiple Coextrusion", *Ceramic Processing Science and Technology*, pp. 297–301 (No Date).

Reed, Principles of Ceramic Processing, $2^{nd}$ Edition, 1995, pp. 350–353 (No Month).

Shannon et al., "The Production of Alumina/Zirconia Laminated Compsites By Coextrusion", *Ceramic Engineering & Science Proceedings*, Sep./Oct. 1995, pp. 1115–1120.

*Primary Examiner*—Michael Marcheschi
*Attorney, Agent, or Firm*—Paul W. Busse

[57] ABSTRACT

Alumina-based abrasive material having at least an internal layer is provided. Preferably, the abrasive material results from co-extrusion of at least two different sols. In some preferred processing, steps to provide multiple internal layers are conducted.

15 Claims, 8 Drawing Sheets

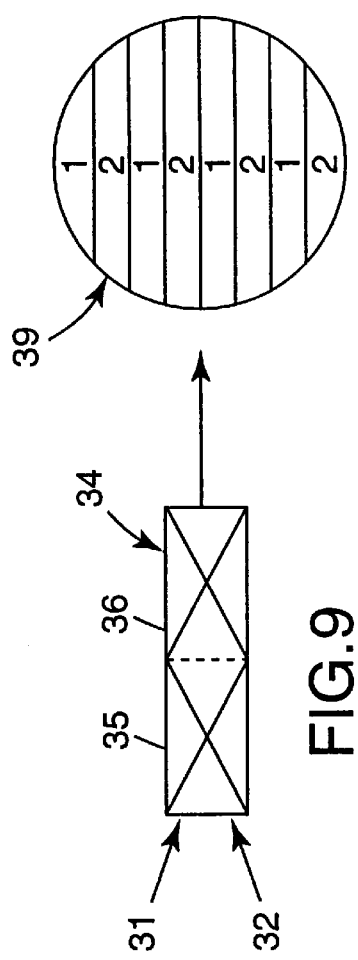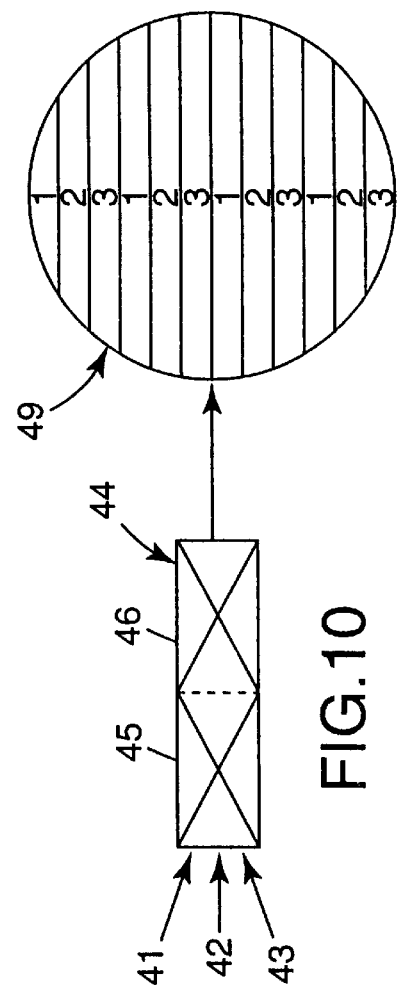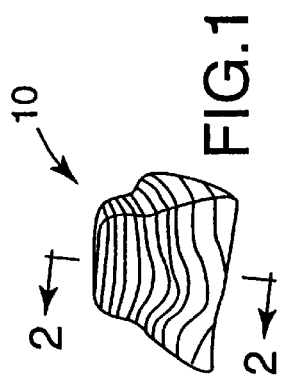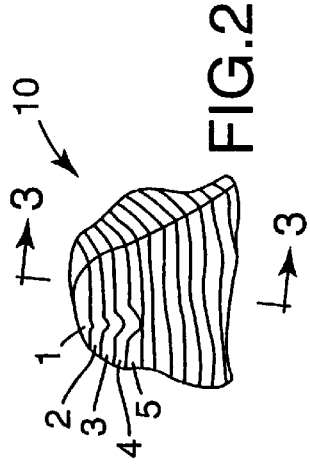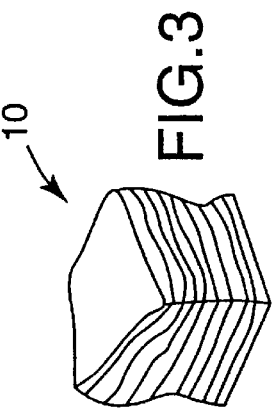

LAYERED ALUMINA-BASED ABRASIVE GRIT, ABRASIVE PRODUCTS, AND METHODS

FIELD OF THE INVENTION

The present invention concerns alumina-based abrasive grit material; methods of preparing such abrasive grit material; and, products incorporating the abrasive grit material. In general, abrasive grits as described herein have internal stratified or layered structures. The abrasive grits can be made using sol-gel techniques.

BACKGROUND OF THE INVENTION

Abrasive grits or particles have long been employed in abrasive products. These abrasive products include bonded abrasives (e.g., grinding wheels), coated abrasives, and nonwoven abrasives. Preferred abrasive grit is typically tough, hard, and chemically resistant to the workpiece being abraded. A "tough" abrasive grit is generally strong and fracture resistant. A "hard" abrasive grit generally resists yielding or dulling from the forces of grinding. When the abrasive grit does yield or dull, decreased abrading performance typically results.

One common type of aggressive abrasive grit, known as fused alumina, is formed by heating a source of aluminum oxide to a molten state, rapidly cooling and then crushing. This type of abrasive grit is hard, tough, and chemically resistant.

A more recently developed type of abrasive grit is often referred to as alpha alumina-based ceramic abrasive grit. This type of abrasive grit can be made by a sol-gel process, wherein, for example, a dispersion comprising a liquid medium (typically water), alpha alumina monohydrate, and optional additives such as metal oxide precursors (e.g., magnesium nitrate), is dried, crushed, calcined, and then sintered. The resultant ceramic abrasive grit is typically tougher than the fused alumina grit, and typically exhibits superior performance in abrading operations.

Abrasive products containing sol-gel based alpha alumina grits or particles have been in commercial use for up to 15 years. During this time, there have been numerous improvements made to the alumina abrasive grits or particles. Some of these improvements concern modifications to the crystal structure (referred to as the microstructure) of the alpha alumina crystals which form the abrasive grits or particles. The abrasives industry has, in general, been seeking higher performing alumina abrasive particles to incorporate into abrasive articles.

SUMMARY OF THE INVENTION

According to the present invention there is provided alumina-based abrasive grit having internal stratified or layered structure. Generally, at least one internal layer is found in the abrasive grit. Techniques for preparing abrasive grits having multiple internal layers are provided.

The internal layering may comprise alternating layers of two different materials, or multiple layers of more than two types of materials. The layering, in preferred constructions, results from co-extrusion processes. The co-extrusion process can be combined with stratifying or mixing, to achieve still more layers.

In some applications it may be desired to co-extrude two materials, which although prepared differently, may result in somewhat the same microstructure and chemical structure. Additionally, in some instances, advantages may be seen from co-extruding two identical materials, even in situations wherein no difference can be observed between the two structures in the final produce.

General techniques of processing, according to the present invention, comprise co-extruding to form a co-extrudate, with or without a mixing step. The co-extrudate is generally dried and fired to form ceramic product. Typically, during processing, the co-extrudate can be crushed, broken or cut to form either a randomly shaped or a shaped particle, and in some instances sizing will be involved in order to obtain a preferred grade of abrasive grit.

BRIEF DESCRIPTION OF THE DRAWINGS

FIG. 1 is a schematic view of an abrasive grit of the present invention.

FIG. 2 is a cross-section of the abrasive grit of FIG. 1 taken along line 2—2.

FIG. 3 is a cross-section of the abrasive grit of FIG. 2 taken along line 3—3.

FIG. 9 is a schematic of a process for production of abrasive grits according to certain applications of the present invention.

FIG. 10 is a schematic of a process for production of abrasive grits according to certain alternate applications of the present invention.

DETAILED DESCRIPTION OF THE PREFERRED EMBODIMENT

Selected Definitions

Figure 4:
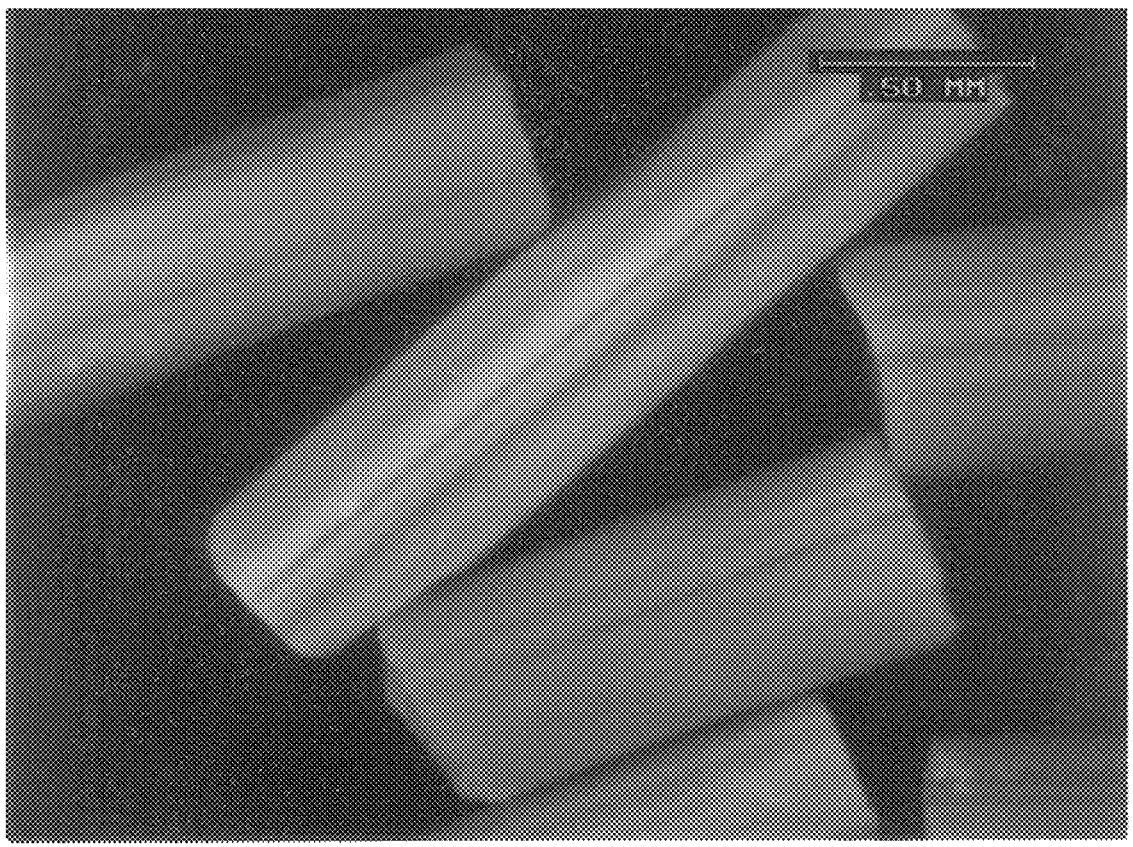
FIGS. 4 through 8 are photomicrographs of abrasive grits made according to the method of the present invention.

The term "abrasive grit" or "abrasive particle" as used herein refers to ceramic bodies used for abrading, cutting, smoothing, and/or polishing. Typically, abrasive grits or particles, for this patent application, range from 30 to 5000 micrometers in size (largest dimension). Generally, abrasive grits or particles are sized or graded, for commercial use or sale. The grades are generally defined by sizing with screens. The screen or grades are defined in a variety of manners, and by various standards organizations. In the United States, typically ANSI (the American National Standards Institute) standards are used. Also commonly used are FEPA (Federation of European Producers of Abrasives) and JIS (Japanese International System) grading systems. Common grades (ANSI) are 24, 36, 50, 80, 100, 120, 150, 180, 220, 240, 320 and 400. The number with respect to an ANSI grade refers to a distribution of particle sizes as defined in ASNI standard B74.18. The standards, for example ANSI standards, generally define grades with respect to some percentage of grit population within a size range, and a limit on the amount of grits outside of the defined size. ANSI 320 generally corresponds to grits which have a largest dimension of about 40–45 micrometers; and ANSI 120 generally refers to grits which have a largest dimension of about 150 micrometers. A grade may be defined as "+80–120" meaning that the material is one which will pass through a number 80 screen (USA Standard Testing Sieves, American Society for Testing and Materials E-11 Specification), but which does not pass through a number 120 screen.

The term "internal layer" as used herein refers to a region of ceramic material present in the referenced ceramic body, for example, an abrasive grit. In order to comprise an "internal layer", the region of ceramic material, in three dimensions, should exhibit the following characteristics: (1) it should be present within the ceramic body such that it is bounded on two opposite sides by ceramic material, typically "densified" ceramic material; (2) when a selected cross-section is taken through the layer, the "artifact" of the layer (or the layer edge) viewable in the cross-section must extend over a length of at least 1 micrometer; and, (3) when it is viewed in a direction orthogonal to the previously mentioned selected cross-section (either in cross-section or upon edge viewing) the artifact of the layer viewable should extend over a length of at least 1 micrometer. Alternately stated an "internal layer" has a dimension of at least 1 micrometer in two (orthogonal) directions.

As used herein, the term "internal layer edge", with reference to viewing in a cross-section, refers to an artifact of the identified layer viewable in the cross-section. To qualify as an "internal layer edge", the artifact viewable in the cross-section must extend continuously (i.e., without a gap or break) a distance of at least 1 micrometer.

As used herein, the term "cross-section" refers to a cut, polished, or otherwise prepared surface of a ceramic body or abrasive grit which typifies (or represents) the constituents of the grit through its depth in a selected direction. A typical method of preparing a cross-section of an abrasive grit is as follows. The abrasive would be prepared by mounting the grits in a mounting material, for example, EPOMET® (& mounting resin available from Buehler, Ltd., Lake Bluff, Ill. The grits and mounting material are formed into a cylindrical slot measuring about 1.0 inch (2.54 cm) in diameter and 0.75 inches (1.91 cm) tall. The mounted sample is polished using an EPOMET® polisher and METADI® diamond slurries, both from Buehler, to obtain polished cross-sections and samples. The final polishing step uses one micrometer diameter slurry. The final surface finish of this sample would be essentially free of gouges and scratches when viewed using a light microscope at 100×. To obtain a cross-section orthogonal to a first cross-section, the polished grits are removed from the cylindrical slot by slicing through the slot using a diamond saw parallel to the polished surface to obtain a wafer about 1 inch in (2.54 cm) diameter and about 0.25 inch (0.64 cm) thick. A segment of the wafer is cut perpendicular to the polished surface. The surface is placed upright in a mold or press so that the polished cross section is parallel to the mold wall; the cross-section again being mounted in EPOMET® to form a cylindrical slot (with the original polished surface parallel to the wall of the slot). The molded sample is polished as before to form a polished surface perpendicular to the original polished surface. These techniques for cross-sectioning are versions of well-known and widely used polishing and cross-sectioning techniques in the abrasives industry. Any of the conventional, known, techniques are suitable. The above specification was presented as an example.

As used herein, the term "at least one" when used in connection with the term "cross-section" is meant to only refer to at least one possible selected cross-section. It is not meant to indicate that all possible selected cross sections would exhibit the feature recited. To qualify as an "at least one" cross-section, the cross-section must be taken at an angle such that it indicates completely, in thickness, both the internal layer and at least those regions of ceramic material immediately adjacent the selected internal layer on opposite sides thereof To qualify as a "cross-section" in this context, the cut or cross-section need not be taken through all layers, in a multilayered system. It is also not a criterion, for a cut to qualify as a cross-section, that the cut be taken perfectly perpendicularly to a plane of extension, or a surface of extension, of the internal layer. Cross-sectioning at an angle to the extension of an internal layer qualifies, as long as the angle is sufficient and appropriate to at least cut through the complete depth of extension of the two opposite portions or regions of ceramic material immediately adjacent the artifact of the first internal layer, when examined along the cross-section.

When viewed in cross-section, the first internal layer edge will be considered "contiguous", with respect to an adjoining region of ceramic material immediately adjacent, if no separation between the first layer and the adjoining region along the line of contact (or interface between the two regions) is viewable in the cross-section. An adjacent extension of the regions or layers will sometimes be referred to herein as "continuous and contiguous" if it is not only contiguous, but there are also no gaps or lack of continuity in either one or the two adjoining layers along the line of contact. As a point of reference for clarity, the interface between an autogenously bonded particulate coating on an abrasive core does not typically qualify as "continuous and contiguous" because gaps in the coating are typically observed in the cross-section.

Herein, when a layer or layer edge is referenced as having a "continuous extension" when viewed in a cross-section, it is meant that the longitudinal extension of the layer edge, in the cross-section, extends continuously and without break. For example, if reference is made to a continuous extension of at least 30 micrometers, it is meant that the layer edge, when viewed in the cross-section, extends uninterrupted by gaps for a distance of at least 30 micrometers. A "continuous" extension may be straight or have curves, folds, bends or nodes in it.

Herein when a material is characterized by the term "alumina-based", it is meant to refer to the characterized material comprising at least 50% by weight $Al_2O_3$ on a theoretical oxides basis. The term "alumina-based" may be used in reference to a particular layer or region alone, or to an overall grit. A conclusion that a referenced material is "alumina-based" can, in some instances, be derived from: (a) analytical measurement; or (b) calculation based upon starting materials; or (c) both.

Herein the term "greatest dimension of width" when used in reference to an abrasive grit, when viewed in cross-section, refers to the longest dimension, when measured outer edge to outer edge across the abrasive grit in the selected cross-sectional view. There is no requirement in connection with this definition that the cross-section be taken such that the largest dimension of the overall abrasive grit is reflected therein. As a theoretical example: if the abrasive grit were a perfect, long, cylinder, and the cross-section were taken perpendicularly to a longitudinal axis, and parallel to the end surfaces, the "greater dimension of width" for the view would be the cylinder diameter, in spite of the fact that the largest dimension of the selected cylinder is its length along the longitudinal axis.

Herein the term "outer periphery" when used to define a portion of an abrasive grit, refers to an outermost surface or edge of the abrasive grit. If the abrasive grit is a grit which is "coated", the term "outer periphery" is meant to refer to the outer surface of the coating.

Herein when it is said that two regions, layers, portions or phases differ from one another with respect to "microstructure" it is meant that there is some difference in the arrangement, shape, size or pattern of particles, crystals or constituents between the two regions, layers, portions or phases being compared, as seen in cross-section visually or with the aid of some microscopy technique. For example, if a densified nucleated internal layer is bounded by a densified non-nucleated ceramic material, a thermally etched (at about 1250° C. for 20–30 minutes) cross-section would typically show a visual difference between the regions when observed by scanning electron microscopy (SEM).

Herein the term "densified" when used in reference to a portion of an abrasive grit, means that when the abrasive grit (when viewed in cross-section) does not appear to absorb a significant amount of red dye. A useable red dye test for determining densification is as follows. A drop of red dye ("P303 A Penetrant" from Uresco Androx of Ceritos, Calif., for example) is placed onto a polished cross-section of the abrasive grit exhibiting internal layers. The dye is then washed away with water. Densified ceramic material will not absorb a significant amount of dye whereas non-densified ceramic material will absorb the dye and will retain a reddish or pink hue. It is noted that in general, in the abrasives industry, hardness or microhardness tests are used to evaluate theoretical density of grits, and thus extent of densification.

Herein when it is said that two regions, layers, portions or phases differ from one another with respect to "composition" it is meant that one is able to detect differing amounts of elements or ingredients through imaging or microspectroscopic techniques involving one or more of: back-scattered electron imaging; energy dispersive x-ray microanalysis; electron energy loss spectroscopy (EELS); electronmicroprobe; or Fourier Transform Infrared spectroscopy (FTIR). Alternatively, a difference in composition can typically be inferred from knowledge that the layers were derived from two or more compositions which differed in ingredients in some manner.

Herein when it is said that two layers, regions, portions or phases are "indistinguishable" from one another with respect to crystalline structure, it is meant that when viewed in cross-section, visually or by the use of light or electron microscopy techniques, the microstructures of the two layers, regions, portions or phases being compared cannot be visually distinguished with respect microstructure characteristics. This can typically be inferred if the two regions were made from the same composition.

Herein when it is said that two layers, regions, portions or phases are "indistinguishable" from one another with respect to composition, it is meant that one is unable to detect differing amounts of elements or ingredients by imaging or microspectroscopic techniques such as: back-scattered electron imaging; energy dispersive x-ray microanalysis; electron energy loss spectroscopy (EELS); electron microprobe; and Fourier Transform Infrared spectroscopy (FTIR). This can typically be inferred if the two regions were made from the same composition.

General Principles

In general, abrasive grits according to the present invention have structures including an internal layer. In many instances, multiple internal layers will be present. Hereinbelow, detailed description is provided concerning creation, identification and characterization of the internal layer structure. In general, abrasive grits having internal layers can be identified either by: artifacts viewable or otherwise detectable in cross-sections; or, inference from the processing technique used. The presence of the internal layers will, in general, readily result from preferred methods of preparation described herein.

Typical preferred processing, to generate internal layered structures according to the present disclosure, will comprise processing in which, during the processing, there is a co-extrusion of two or more compositions, such as sols. The co-extrusion step may be continuous or intermittent. Multiple layered stratified systems can be generated by multiple extrusions or by incorporating a step of mixing with the co-extrusion, as described below. Each of the two or more sol compositions which are co-extruded may comprise any of the following:

1. aluminum oxide hydrate sols or sol-gel compositions;
2. alpha alumina sols or sol-gel compositions; for example boehmite-based compositions;
3. transitional alumina powder compositions;
4. solutions of aluminum oxide precursor; or
5. hybrid compositions containing two or more of the above.

In general, except for the step of co-extruding, the techniques used to prepare the abrasive grit may involve conventional processing techniques as described for example in U.S. Pat. Nos. 4,314,827 (Leitheiser); 4,881,951 (Wood); 4,770,671 (Monroe); 4,744,802 (Schwabel); 4,623,364 (Cottringer et al.), and 5,227,104 (Bauer). The complete disclosures of these references are incorporated herein by reference.

The Layered Abrasive Grit Structures

Alumina-based abrasive grits according to the present invention include layered structures. Typically the grits comprise ceramic particles including at least one alumina-based internal layer. In typical grits the referenced alumina-based internal layer will have a first dimension of at least 10 micrometers (typically at least 30 micrometers and most typically at least 50 micrometers) and a second dimension (orthogonal to the first) of at least 10 micrometers, again typically at least 30 micrometers and most typically at least 50 micrometers. In many instances, the layer will extend completely across the grits, when viewed in cross-section. For many grits the existence of such an internal layer can be confirmed by evaluating layer artifacts, in polished cross-sections.

In general, this will be understood by reference to the schematics of FIGS. 1, 2 and 3. In FIG. 1 a schematic representation is provided of a selected (hypothetical) grit. In FIG. 2 a schematic representation of a polished surface cross-section taken generally along section line 2—2 illustrated in FIG. 1, is depicted. In FIG. 3 a cross-section taken along section line 3—3 illustrated in FIG. 2, is shown.

In FIG. 1, artifacts of the multiple layer are viewable from the side edge. The particular grit shown exhibits distinct layers in the view selected. Of the layers, ten layers would comprise internal layers according to the general definitions herein (assuming that the scale used is appropriate). Assume that the layers for the schematic of FIG. 1, comprise two different materials. More specifically the top layer in the picture, and alternating layers from there (i.e., layers 3, 5, 7, and 9 counting down from the top) comprise the first material; and layers 2, 4, 6, 8, 10 and 12 counting from the top, comprise the second material. Note that the layers generally extend completely across the grit. For purposes of example, assume that the materials differ only in that the first ceramic layers resulted from extruding a material with a nucleating agent therein; and, the second ceramic layers resulted from extruding a composition which did not include a nucleating agent.

In FIGS. 2 and 3, cross-sectional artifacts of the internal layers are viewable. As the figures indicate, in general as a result of the manner in which the layers are formed, i.e., typically co-extrusion, the layers reflect contours, without spacing. For example, in FIG. 2, the layer numbered 4 includes a node which encroaches on the layer numbered 5. A node is a fold or bend in the layer which formed from pressure (flow) differentials during co-extrusion. What is significant, is that adjacent layers, numbered 4, 3, and 2, include analogous nodes.

Referring to FIGS. 2 and 3, the artifacts viewable are layer edges. Note that the layer edges may be orthogonal to layer extension through the associated portion of the grit 10, or they may be at an angle. The angle selected for the cross-section is relatively unimportant, as long as it reflects the presence or absence of adjacent layers to the internal layers selected for viewing. For example, layers numbered 1 and 3 are adjacent to, and on opposite sides of, the internal layer numbered 2.

Structure similar to that shown in FIG. 2 reflects "continuous" and "contiguous" layers. With respect to the continuity (continuous nature) of the layer, reference is made, for example, to layers numbered 2, 3, and 4. Each edge of the layer numbered 3 is continuous in extension with the layers numbers 2 and 4 completely across the cross-section, i.e., from the left side of the grit to the right side. That is, that while it does include bends, folds, and curves therein, it does not include breaks or spaces. Further, the layer numbered 3 is contiguous with layers 2 and 4, when viewed in the cross-section. That is, there are no spaces or gaps between these layers; i.e., they do not separate. Also, both are continuous in their respective extensions along the viewed interface.

Structures such as those schematically represented in FIGS. 1–3, can readily be obtained using co-extrusion techniques described hereinbelow. The number of layers viewable in any given abrasive grit resulting from the process will be determined, among other things, by the following: the number of layers co-extruded; the extent of mixing of the co-extrusion; and, the size of particles to which the extrusion is ground or broken. Not every grit resulting from a co-extrusion process will necessarily reflect all layers resulting from the co-extrusion or mixing of the co-extrusion. This is at least because during the breaking and grinding processes the grits may be fragmented to dimensions smaller than would reflect all layers from processing. However, typically if co-extrusion processes described herein are used, and the grits examined have a size (average largest dimension) of at least 30 (typically at least 50, often at least 70, and in many instances greater than 100) micrometers, at least one internal layer will be readily detectable in at least one selected cross-section.

Of course the extent to which the artifacts of the layers can be viewed, will depend upon the cross-section selected. Not every possible cross-section will reflect the structure of an internal layer. A cross-section could be taken, for example, at an angle through a grit such that the cross-sectioning is only through one layer. This does not mean that the grit does not possess an internal layer, but rather simply that the cross-section chosen was inappropriate for viewing or detecting the internal layer.

If, during co-extrusion, intermittence in extrusion of one or more of the co-extruded materials occurs, the product which results may have a lack of continuous nature to the internal layers. For example, not every selected internal layer would be continuously bounded on a side by a selected layer. This is logical, since, during the co-extrusion, extrusion of one of the layers would have been interrupted, while another layer continues to extrude.

In general, when abrasive grits are made according to the extrusion or co-extrusion processes described herein, they may sometimes be referred to as "sol-gel" abrasive grits or particles. By this it is meant that what is extruded or co-extruded comprises, at least in part, a sol or sol-gel composition as described herein.

Attention is directed to FIG. 4. FIG. 4 is a photograph, the image being taken by light microscopy, of a co-extrusion product according to Example 2, fired but not crushed or ground. Note the 0.50 mm, or 500 micrometer, scale. The rods, which result from the co-extrusion, show clearly the stratified or multilayered construction. The rods of FIG. 4 are the co-extruded product after the drying, calcining, and sintering steps described. Typically, for manufacture of abrasive grits, the rods shown in FIG. 4 would have been crushed or broken into finer grits or particles, before sintering, which would then (after firing) be sized or classified according to grades for use or sale As is apparent from the description of Example 2, the co-extrusion involved two different sol-gel compositions, with folding to generate the multiple layered structure.

Figure 5:
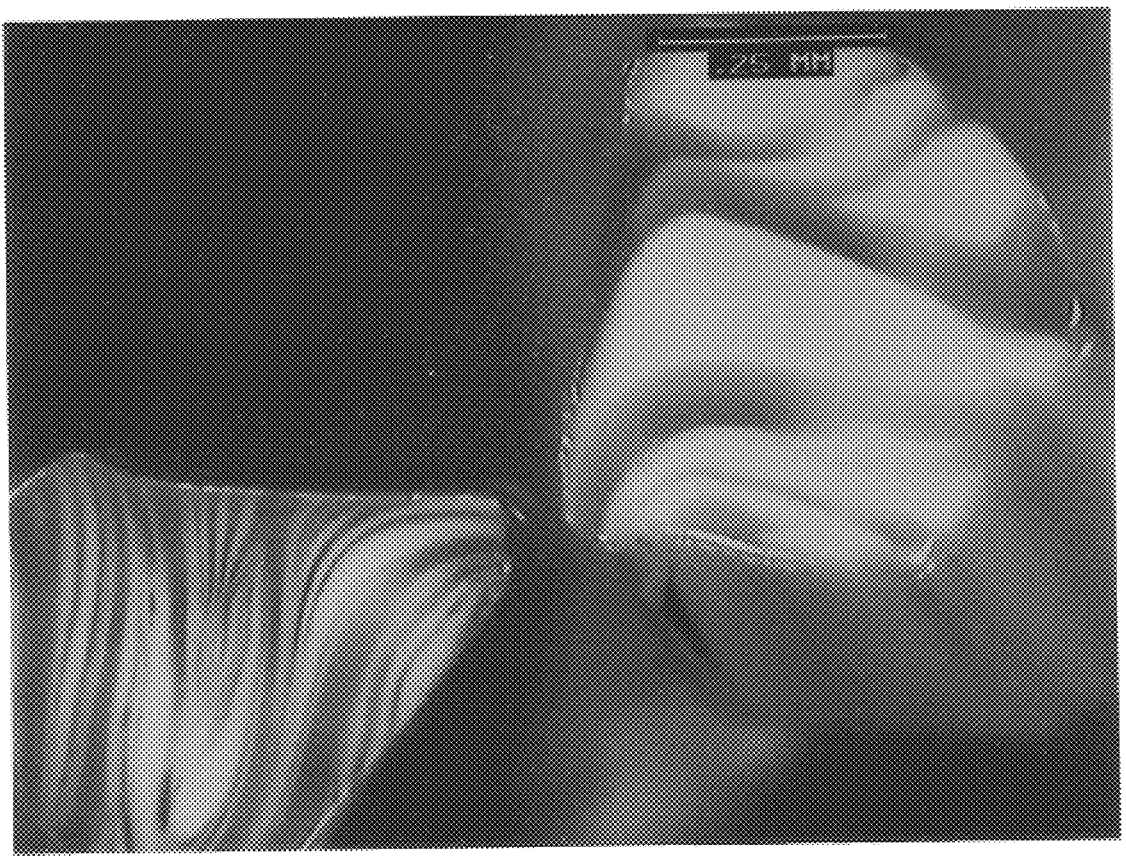

In FIG. 5, a cross-sectional view, prepared as described herein, rods illustrated in FIG. 4, is shown. Note the 0.25 mm (250 micrometer) scale. One can see the multiple layers clearly in the two polished cross-sections viewable. In the one in the lower left-hand corner of the picture, one can see that the multiple layers are not "flat" or "straight". Rather, they fold, bend, or wave as they pass from one side of the cross-section to the other. Note that layers on opposite sides of any selected internal layer tend to follow the same contour. Also note the continuity of the various internal layers. That is, they generally extend continuously and uninterrupted across large parts of the cross-section.

In general, when rods according to FIGS. 4 and 5 are crushed (either before or after sintering) into abrasive grits or particles, and are sized, the resultant abrasive grits or particles will exhibit, in cross-section, features analogous to those viewable for the rods. Of course the grits would typically be substantially smaller, with respect to largest dimension, than the rods from which they are formed.

Figure 6:
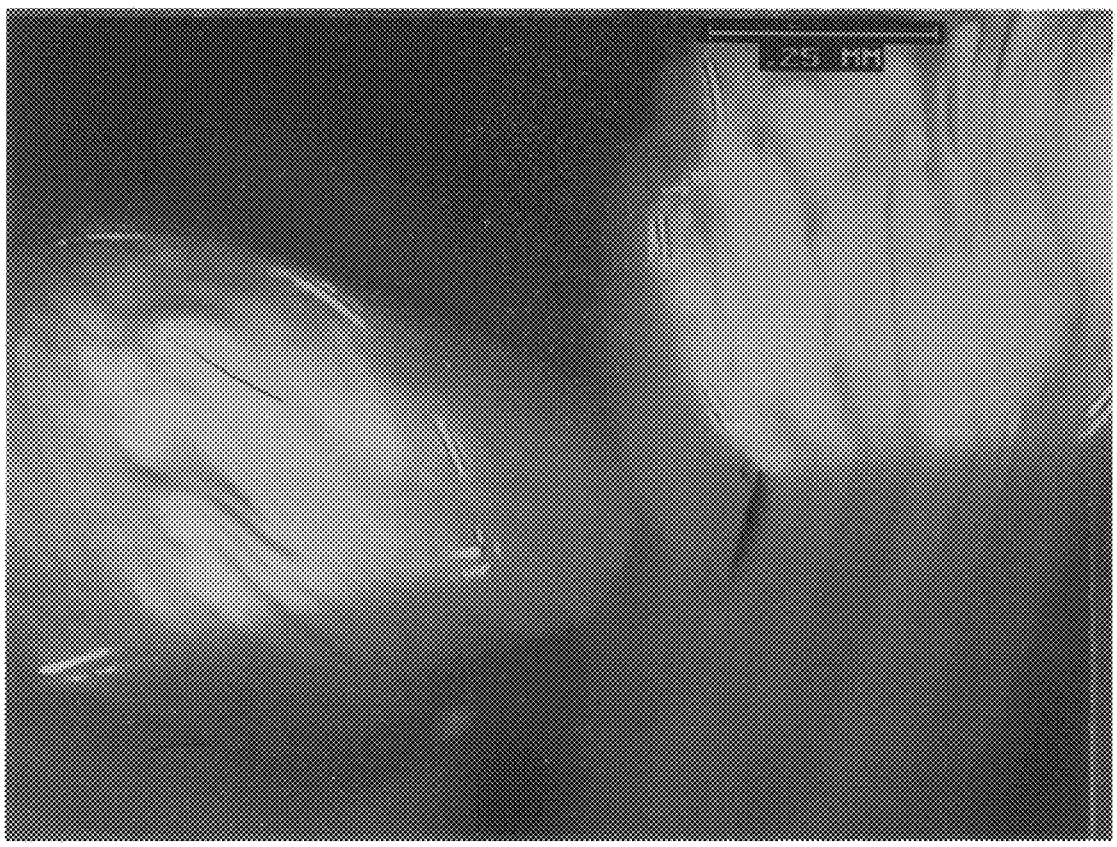

Attention is now directed to FIG. 6. In FIG. 6, rods similar to those shown in FIG. 4 are depicted in cross-section. However, especially note the rod in the upper right-hand corner of FIG. 6. This rod has been cross-sectioned twice, similarly to the schematic of FIG. 3, and is viewed generally in perspective, so that one can see around the "corner" of the cross-section. From this it will be apparent that the artifacts viewable in the cross-section, for example, the dark lines, are the artifacts of internal layers since the layers can be traced "around" the "corner" and down or across the orthogonal cross-section. That is, all three (orthogonal) dimensions of the layer artifact can be viewed (length, width, thickness). From a view similar to that shown in FIG. 6, it is apparent that the structure evaluated is a stratified or layered structure. With respect to FIG. 6, note the 0.25 mm (250 micrometer) scale.

Figure 7:
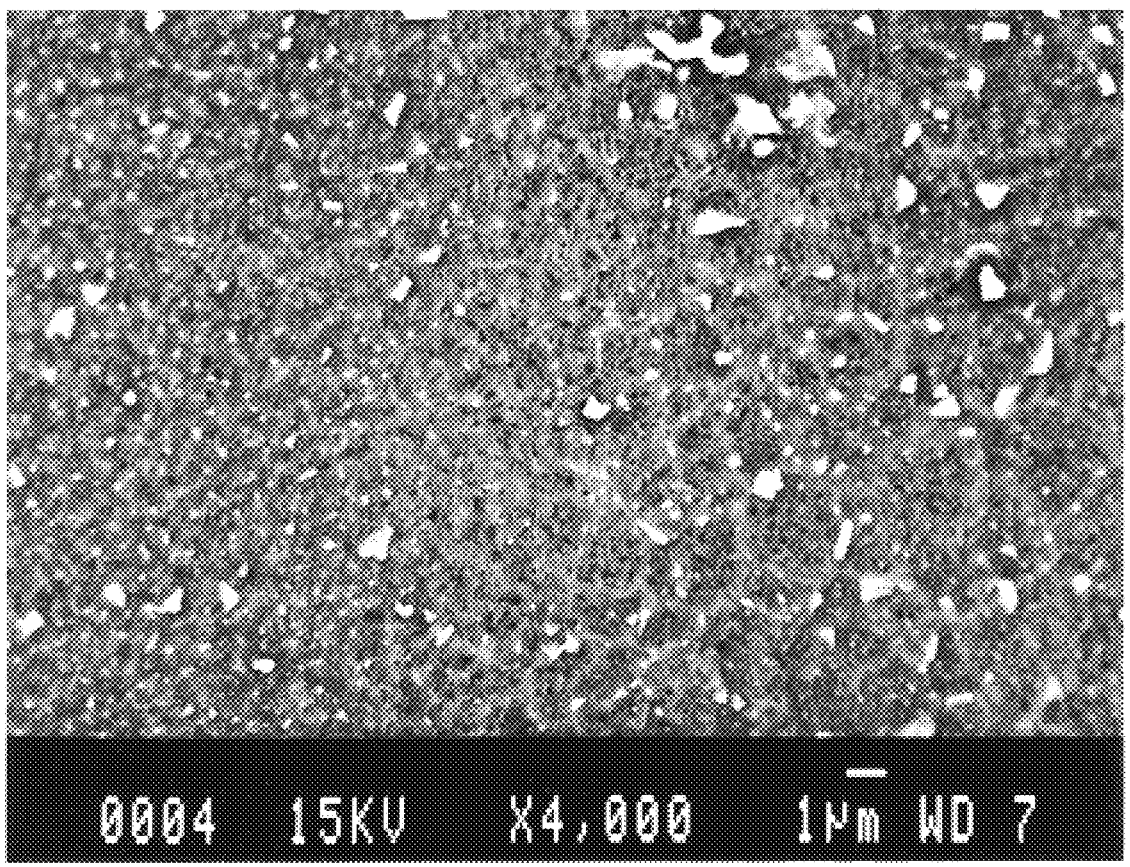

Attention is now directed to FIG. 7. FIG. 7 is a high magnification photomicrograph taken using back scattered electron imaging showing an interface between two co-extruded phases in a rod of the type indicated generally in FIGS. 4–6. The phase on the left-hand portion of FIG. 7 is a phase resulting from nucleating with iron oxide; and, the phase on the right-hand portion is a "cellular" phase which results from an extruded phase that did not include iron oxide nucleating agent. In general, as is characterized herein, there is "intimate" contact between the two phases in the center portion of the Figure. That is, the phases do not separate from one another. With respect to FIG. 7, note the 1 micrometer scale in the lower right-hand corner of the photograph.

Figure 8:
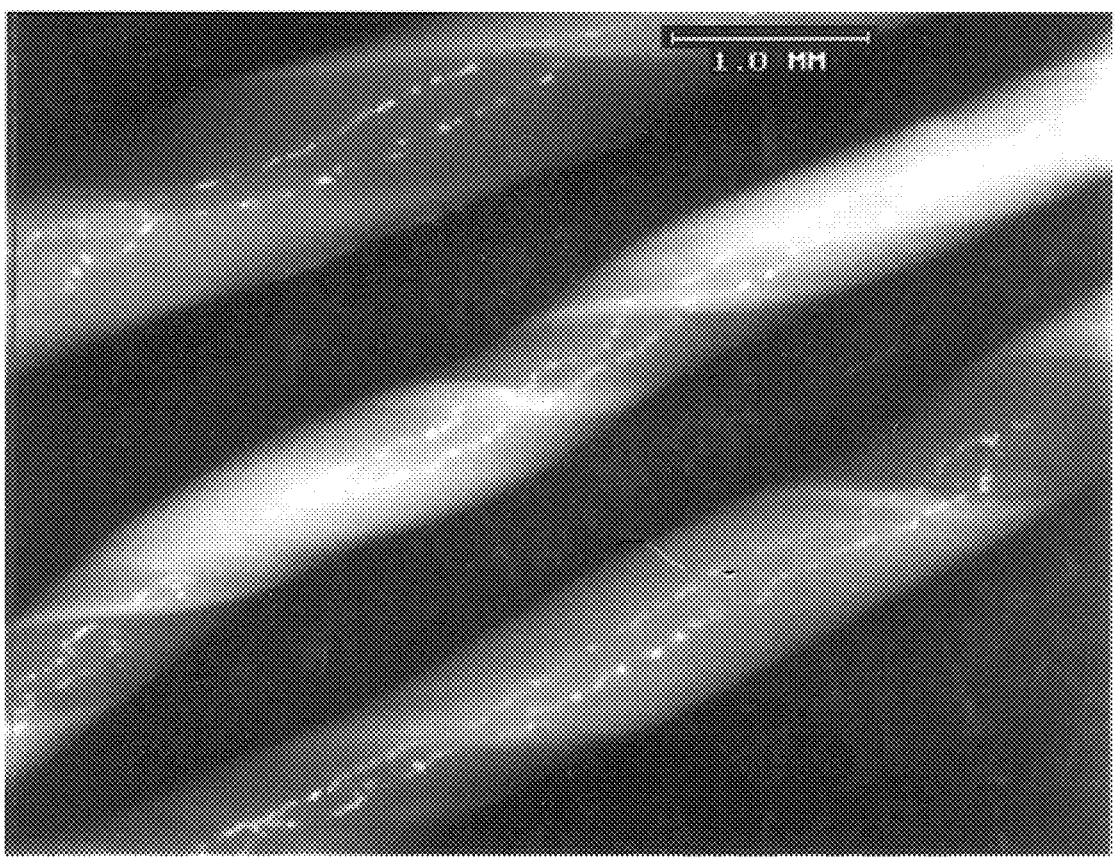

Attention is now directed to FIG. 8. FIG. 8 is a photomicrograph in a perspective view of another embodiment of abrasive rods made according to the present invention. One can easily observe the two layers as they spirally wrap along the length of the rod.

From the schematics of FIGS. 1–3 and the photographs of actual examples shown in FIGS. 4–8, certain general principals and observations with respect to preferred abrasive grits according to the present invention will become apparent. Typically, the grits will have at least one internal layer which is, and in cross-section exhibits, a continuous artifact, of at least 10 micrometers in length, typically at least 30 micrometers, more typically at least 50 micrometers, often at least 70 micrometers and in many instances 100 micrometers or more. The artifact may be straight, or extend continuously through curves, etc. In general, material on opposite sides of the layer or layer artifact will be viewed to be continuous also, and generally contiguous with the layer or layer artifact. That is, there is generally no separation between the layer and materials adjoining it on opposite sides; and, the materials joining the layer on opposite sides generally themselves extend continuously for at least 10 micrometers, typically at least 30 micrometers, more typically at least 50 micrometers, often at least 70 micrometers and in many instances at least 100 micrometers. In some instances the layer artifact will be viewed to extend continuously at least 50%, preferably at least 75%, of the distance across the greatest dimension of the abrasive grit viewable in the cross-section. When the layer is viewed as extending across the viewed cross-section, it may be characterized as intersecting an outer periphery of the abrasive grit at two, spaced, locations. It is also shown that systems having multiple internal layers are readily made, and identifiable using the techniques described herein.

It is apparent that typically if a layer goes through folds, bends or nodes, generally layers immediately adjacent to it go through somewhat analogous folds, bends or nodes. This results from the typical method of preparation, co-extrusion. This effect may not extend, completely, throughout the entire system when a great many layers are involved, however.

The use of double cross-sectioning, i.e., a first cross-section and an orthogonal cross-section, to characterize or evaluate a layer in several dimensions is readily demonstrated and understood from FIGS. 3 and 6.

A variety of desirable features can be accommodated using the techniques described herein. For example, a relatively expensive component may be included in one or more of the co-extruded compositions, but not in all. The abrasive grit may be provided with certain advantages resulting from the component, without the need for use of quite as much component, by weight, in the overall composition from which the grits are formed. This is exemplified by Experiment 2. The zirconia introduced in one of the layers of Example 2 results in a layer which is relatively hard and has desirable fragmenting characteristics, with respect to use in abrasives. Through the co-extrusion process described, the zirconia did not have to be included throughout the grit, but rather a lower amount of zirconia, localized in specific layers, can provide an advantageous abrasive.

It is also foreseen that in some systems it may be desirable to have layers with different properties, to achieve desired operating effects. These can be readily achieved with the techniques described.

Examples of Usable Sol-Gel Compositions

1. Dispersion-type Compositions

Among the types of compositions usable as "sol-gels" or "sols" in the techniques described herein, are dispersion-type compositions. The terms "dispersion-type compositions" and variants thereof, are meant to refer to compositions in which the alumina ceramic or alumina ceramic precursor is in the form of a suspended solid. That is, the alumina ceramic precursor is not in solution. Dispersion-type compositions, usable in sol-gel techniques for preparing ceramics, are well known. Versions of them are discussed, for example, in the following references, each of which is incorporated herein by reference: U.S. Pat. Nos. 4,881,951 (Wood et al.); 4,770,671 (Monroe et al.); 4,744,802 (Schwabel); 4,574,003 (Gerk); 4,314,827 (Leitheiser et al.); 4,623,364 (Cottringer et al.); 4,964,883 (Morris et al.); 5,201,916 (Berg et al.); 5,728,184 (Monroe); 5,776,214 (Wood); 5,779,743 (Wood); 5,893,935 (Wood); and U.S. application Ser. No. 08/781,557 (filed Jan. 9, 1997).

A. Alpha-alumina hydrate sols

A typical useful dispersion-type composition (or sol) comprises a mixture of liquid medium and alpha alumina monohydrate (typically boehmite), although other hydrates may be used. The boehmite (or other hydrate) can be prepared by any of various conventional techniques, or it can be acquired commercially. Suitable boehmite is commercially available, for example, under the trade designations "DISPERAL" from Condea Chemie, GmbH, of Hamburg, Germany, and "DISPAL", "CATAPAL A", "CATAPAL B", and "CATAPAL D" from Condea Vista Chemical Co. of Houston, Tex. Other commercially available boehmites which may be useful include those available from LaRoche Industries of Atlanta, Ga., e.g., under the trade designations "VERSAL 150", "VERSAL 250", "VERSAL 450", "VERSAL 700", "VERSAL 850", and "VERSAL 900" (see, e.g., U.S. Pat. No. 5,728,184 (Monroe), the disclosure of which was previously incorporated herein by reference). The commercial aluminum oxide monohydrates referred to above are in alpha form, are relatively pure (including relatively little, if any, hydrate phases other than monohydrate), and have high surface areas.

Preferably, when boehmite is used in methods according to the present invention, the boehmite selected has an average ultimate crystallite size of less than about 20 nanometers (more preferably, less than about 12 nanometers); with "crystallite size" being defined by the longest dimension of a crystallite.

As the incorporated references indicate, a variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost. In some instances it may be desirable to use tepid water. In still others warm or hot water may be desirable.

Typically, when the alumina precursor is boehmite, the dispersion will contain at least 10% by weight deionized water, more commonly between about 20% and 80% by weight deionized water. Typical, preferred, dispersions comprise from about 2% to about 80% by weight alpha aluminum oxide monohydrate (typically boehmite), typically about 30% to 65% weight percent. The weight percent is based on a total of hydrate plus liquid carrier, without regard to adjuvants or additives. In some instances the alumina precursor may be a recycled material from previous processing, as described in U.S. Pat. No. 4,314,827 (Leitheiser et al.).

A peptizing agent or dispersion aid may be used to produce a more stable sol or colloidal dispersion. Monoprotic acids which may be used as the peptizing agent include acetic, hydrochloric, formic, and nitric acids. Nitric acid is preferred, especially with boehmite sols. Multiprotic acids are normally to be avoided since they can rapidly gel the dispersion or sol, making it more difficult to handle or to mix in additional components. Some commercial sources of boehmite contain an acid titer (e.g., acetic, formic, or nitric acid) to assist in forming a stable dispersion.

The use of defoamers can be helpful in decreasing foaming or frothing which otherwise occurs during milling or stirring. Suitable defoamers include citric acid and its salts. A defoamer is typically used in an amount corresponding to about 1% by weight of the aluminum oxide (on a theoretical oxide basis) present in the dispersion.

Suitable methods for mixing the dispersion include ball milling, vibratory milling, and/or high shear mixing (colloid mills). High shear mixing is the preferred mixing method. Suitable mixers include pail mixers (available, for example, from Sears Roebuck & Company), sigma blade mixers (available for example, from Paul O. Abbe, Inc. of Little Falls, N.J.) and high shear mixers (available, for example, from Charles Ross & Son Co., Hauppauge, N.Y.). Other suitable mixers may be obtained from Eirich Machines, Inc. of Gurnee, Ill.; Hosokawa-Bepex Corp. of Minneapolis, Minn. (including a mixer available under the trade designation Schugi Flex-O-Mix, Model FX-160); and Littleford-Day, Inc. of Florence, Ky.

It is also possible that the mixing can be done within an extruder, if desired. This extruder can be a single screw or twin screw extruder.

B. Sols of alpha-alumina or alpha-alumina precursor (other than hydrates)

Dispersions (or sols) of alpha-alumina particles or alpha-alumina precursor particles (other than hydrates) can also be used. In general, techniques including them are similar to those involving hydrates.

A preferred alpha alumina material is commercially available under the trade designation "AKP-50" from Sumitomo Chemical of Japan. Various transitional alumina as suitable for use in preparing the second preferred alumina-based dispersion include chi alumina, gamma alumina, eta alumina, and mixtures thereof. A suitable transitional alumina which includes chi alumina is commercially available, for example, under the trade designation "AA100W" from Alcan Corp. of Cleveland, Ohio.

It is preferred that the particulate alumina material, from which the dispersion is formed, comprise powdered material having a particle size distribution such that no more than about 0.5% by weight is greater than about 2 micrometers, and preferably such that no more than 5.0% by weight is greater than 1 micrometer in size (diameter or longest dimension). Preferably, the particle size is on the order of at least about 75% by weight smaller than about 0.7 micrometer, and, more preferably, 99% by weight is less than about 0.7 micrometer. Such particulate material typically not only readily forms the dispersion but also provides a useful precursor to the desired sintered product. Particle sizes within the preferred ranges can be obtained from commercially available materials, or can be prepared, for example, by crushing or ball milling (wet or dry) an alumina source.

As with the hydrates discussed above, a variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost.

In general, the preferred ratio of liquid medium to powdered alumina will be dependent upon the particle size distribution as it relates to the surface area of the powdered material. If water is used, typically weight ratios within the range of about 1:6 (i.e., liquid medium to powdered raw material) to 15:1 will be chosen, although ratios outside of this range may also be useful. It is typically preferred to avoid the use of excess liquids in order to minimize the extent of subsequent drying. It is, however, preferred to use a sufficient amount of liquid so the thoroughly mixed dispersion can be readily handled or moved, for example, by pouring, siphoning, pumping, or extruding.

It is foreseen that if the alumina has relatively high surface area, for example, about 200–300 $m^2/g$ (e.g., that commercially available under the trade designation "AA100W" from Alcan), a weight ratio of water to powder of about 5:1 to 10:1 is preferred (about 6:1 to 9:1 most preferred). If, however, the alumina has a relatively low surface area, for example, less than about 20 $m^2/g$ (e.g., commercially available under the trade designation "A16" from Alcoa, Pittsburgh, Pa.), a weight ratio of about 1:6 to 2:1 is preferred.

Preferably, the solids content of the dispersion is maximized, and the solids (i.e., particles) are dispersed homogeneously therein. Preferably, the size of the pores in the material dried from the dispersion is minimized. Further, it is preferred that the distribution of pore sizes is as narrow as possible.

In general, the liquid medium, dispersed alumina and other optional additives are mixed until a homogenous slurry or stable dispersion is formed. This mixture, which is sometimes referred to herein as a "stable slip", is one in which, in general, the solids of the slurry do not appear by visual inspection to begin to separate or settle upon standing for about 2 hours (due, it is believed, to the viscosity of the slurry). A stable dispersion can be obtained by thoroughly mixing the alumina, any dispersion aid, and any additional raw materials and additives into the liquid medium, reducing the size of, and/or deagglomerating the particles in the dispersion until the resulting dispersion is homogeneous, and the individual alumina (powder) particles are substantially uniform in size and distribution. Suitable methods for mixing include ball milling, vibratory milling, air stirrer, Coules dissolver, attrition milling and/or high shear mixing (colloid mills). Pebble (e.g., ball, vibratory, attrition) milling techniques are generally most preferred because of their ability to readily reduce the size of the alumina starting material.

Dispersions prepared as described in this section are typically thixotropic. "Thixotropic", as used herein, is meant to describe a slurry that is viscous when under no stress, but has a low viscosity when shear (e.g., mixing) is introduced.

It generally comprises a chalky or milky liquid which can be easily poured or stirred, but which is sufficiently thick so that the solids do not settle within a two-hour period. Dispersions or slips prepared according to the methods described in this section generally have a consistency of about that for latex paint. Undesirable lumpy or heterogeneous mixtures tend to result from inadequate mixing.

Dispersion aids may be used to improve the consistency or stability of the dispersion or slurry. Dispersion aids tend to help prevent or minimize settling and improve the homogenous nature of the slurry by helping to break down large agglomerates.

Preferred dispersion aids include strong acids (e.g., nitric acid) and bases (e.g., ammonium hydroxide), polyanionic polymers such as carboxylate functional polymers, (e.g., polyacrylic acids, polyacrylic acid copolymers, and polyacrylic acid salts), and basic aluminum salts such as basic aluminum chlorides and basic aluminum nitrates. Suitable carboxylate functional polymers are available, for example, under the trade designations "JONCRYL" from Johnson Wax, Inc., of Racine, Wis.; "CARBOPOL" from the B.F. Goodrich Co. of Cleveland, Ohio; "NOECRYL" from ICI Resins US of Wilmington, Mass.; and "VINAC" from Air Products and Chemicals, Inc., of Allentown, Pa.

The desired amount of dispersion aid is believed to depend on the surface area of the particles to be dispersed. Generally, the preferred amount of dispersion aid increases as the surface area of particles increases.

In general, for a dispersion employing strong acids or bases as dispersion aids, sufficient dispersion aid is used to render a pH of less than about 6 (preferably, about 2 to 3) or more than about 8 (preferably, about 8 to 10), respectively.

The most preferred strong acid dispersant is typically nitric acid. Dispersions employing concentrated (70%) nitric acid as the dispersant preferably contain about 2–15% by weight nitric acid, based upon total solids content of the dispersion. The stability of such dispersions may be improved by heat treating the dispersion, for example, by autoclaving it.

Dispersions employing polymeric or basic aluminum salt material as the dispersant preferably contain about 0.1 to about 4% by weight of such dispersant, based on the total solids content of the dispersion.

As with the dispersions of alpha alumina hydrates discussed in the previous section, the use of defoamers can be helpful in decreasing foaming or frothing which otherwise occurs during milling or stirring. Suitable defoamers include citric acid and its salts. A defoamer is typically used in an amount corresponding to about 1% by weight of the aluminum oxide (on a theoretical oxide basis) present in the dispersion or solution.

The dispersion may include other additives such as organic binders (e.g., polyethylene glycol, commercially available, for example, under the trade designation "CARBOWAX" from Union Carbide of Akron, Ohio) and organic solvent(s) (e.g., toluene and hexane). The amounts of these materials are selected to give a desired property (e.g., ease of processing, improved drying of the solids, improved green strength, and reduced foaming).

2. Solutions of Aluminum Salts

Solution-based compositions or sols (not dispersions of Alpha-alumina/alpha-alumina precursors or gels) can be prepared from aluminum salts by techniques also known in the art. Typical preparation techniques include dissolving an aluminum-based salt or complex in water; or diluting or concentrating a solution comprising an aluminum-based salt or complex. Preferably, the solution-based composition comprises, in the range of about 5 to about 45 weight percent, alpha alumina precursor. Preferably, the solution-based composition comprises a soluble aluminum salt or other soluble aluminum-based complex. More preferably, the solution-based composition comprises at least one of the following alpha alumina precursors: a basic aluminum carboxylate, a basic aluminum nitrate, and a partially hydrolyzed aluminum alkoxide.

Preferred solution-based compositions include those comprising basic aluminum salts with carboxylate or nitrate counterions or mixtures thereof Preferred aluminum carboxylates are represented by the general formula, $Al(OH)_yD_{3-y}$, wherein y can range from between about 1 and about 2, preferably between about 1 and about 1.5, and D (the carboxylate counterion) is typically an anion such as formate, acetate, propionate, oxalate, and combinations thereof, although others may be used. Aluminum carboxylates can be prepared by techniques known in the art including the methods described in U.S. Pat. No. 3,957,598 (the disclosure of which is incorporated herein by reference), wherein aluminum metal is digested in a carboxylic acid solution and U.S. Pat. No. 4,798,814 (the disclosure of which is incorporated herein by reference), wherein aluminum metal is dissolved in a hot aqueous solution comprising formic acid and acetic acid.

Preferred basic aluminum nitrates are represented by the general formula, $Al(OH)_z(NO_3)_{3-z}$ wherein z is in the range of about 0.5 to about 2.5. The preparation of basic aluminum nitrates is known in the art and includes the methods taught in U.S. Pat. No. 3,340,205 and British Pat. No. 1,139,258 (the disclosures of which are incorporated herein by reference), wherein aluminum metal is digested in a nitric acid solution. Basic aluminum nitrates may also be prepared according to U.S. Pat. No. 2,127,504 (the disclosure of which is incorporated herein by reference), wherein aluminum nitrate is thermally decomposed.

3. Hybrid approaches

It is within the scope of the present invention to prepare abrasive grit precursor from a dispersion prepared by providing dissolved aluminum salts in a dispersion of alpha alumina and/or alpha alumina precursor, or by mixing a dispersion of alpha alumina and/or alpha alumina precursor with a solution-based composition. Other mixtures of the various types of materials discussed above can also be used.

Other Additives

The dispersion or solution optionally may include precursor of oxide modifier (e.g., precursor to, or oxides of, aluminum, magnesium, cerium, zinc, cobalt, nickel, zirconium, hafnium, iron, silicon, manganese, chromium, yttrium, calcium, lithium, sodium, strontium, praseodymium, erbium, titanium, vanadium, tantalum, niobium, samarium, ytterbium, neodymium, lanthanum, gadolinium, dysprosium, and mixtures thereof) to enhance some desired property of the sintered abrasive particle or to increase the effectiveness of a subsequent processing step (e.g., the sintering step). Such precursors are generally introduced in the form of salt (typically a metal salt material) soluble in the liquid carrier of the dispersion. Typically, the precursor is a water soluble metal salt. A preferred combination of modifiers is magnesium, neodymium, lanthanum and yttrium at levels of about 0.75%–2.5%, 0.75%–1.5%%, 0.75%–1.5%, and 0.75%–1.5% by weight, respectively, on an oxide basis in the final fired abrasive.

For additional details regarding the inclusion of manganese oxide and precursors thereof in the dispersion or solution, see U.S. Pat. No. 5,690,707 (Larmie et al.), the disclosure of which is incorporated herein by reference.

The dispersion or solution may contain a nucleating material to enhance the transformation of the alpha alumina precursor to alpha alumina. Suitable nucleating materials include fine particles of alpha alumina, or fine particles or precursors of alpha ferric oxide, chromia, titanates, and any other material which will nucleate the transformation, with alpha alumina and alpha ferric oxide being the preferred materials. Nucleating materials are disclosed, for example, in U.S. Pat. Nos. 4,623,364 (Cottringer et al.), 4,744,802 (Schwabel), 4,964,883 (Morris et al.), and 5,219,806 (Wood), the disclosures of which are incorporated herein by reference.

If it is desired that the resulting sintered alpha alumina-based ceramic abrasive grit include zirconium oxide and/or cerium oxide, a preferred method for introducing zirconium oxide and/or cerium oxide is by adding zirconia particles and/or ceria particles to the dispersion or solution. These materials can be added to the dispersion or solution as a sol or as a fine powder. For additional details regarding such zirconium and ceria additions, see: U.S. Pat. Nos. 5,551,963 (Larmie) and 5,429,647 (Larmie), the disclosures of which are incorporated herein by reference.

The Step of Co-Extrusion

One preferred manner of preparing stratified or layered abrasive grits according to the present invention is through a co-extrusion of two or more "different" compositions. By the term "different" in this context, it is meant that the compositions extruded (i.e., being compared) differ from one another in at least one manner. The manner of difference may, for example, be: the presence or absence of some nucleating material or seed material; a difference in amount and/or type of nucleating or seed material; a presence or absence of some precursor of an oxide modifier; different amounts of, and/or different types of, precursor of an oxide modifier; use of different aluminum oxide ceramic precursors; use of the same ceramic oxide precursor but with different sized particles; the presence or absence of some oxide additive, etc. From these examples it will be apparent that the intent with respect to this use of the term "different" is that there be at least one difference between the co-extruded compositions; and, it is intended to accommodate any difference or level of difference.

As mentioned, in some applications it may be desired to co-extrude two materials, which although prepared differently, may result in essentially the same microstructure and chemical structure. Additionally, advantages may be seen from co-extruding two identical materials, although in the final product no difference would be observed between the two structures.

A variety of co-extrusion techniques can be used. For example, the two (or more) compositions can be simultaneously and continuously co-extruded into a layered form. The co-extrusion can be conducted to form two continuous layers in the extrusion, or more layers. The extrusion can be continuous or intermittent, with respect to one or more of the various compositions extruded. Examples of useable extruders include ram extruders, single-barrel extruders, double-barrel extruders, twin screw extruders, and segmented screw extruders. Suitable extruders are available, for example, from Loomis Products of Levitown, Pa., Banpok Co. of Uniontown, Ohio and Hosokawa Bepex of Minneapolis, Minn., which offers, for example, an extruder under the trade designation Extrud-O-Mix (model EM-6). The dispersion can be extruded in a form of a rod, which can be deliquified and crushed, cut, or broken into smaller sized rods or particles. The extruded dispersion can also be shredded and graded. If the abrasive grit is shaped as a rod, it may have a diameter of 30 to 5000 microns, generally 100 to 500 microns, and an aspect ratio (i.e., length to width ratio) of at least 1, generally 1 to 25, more preferably 2 to 8, and most preferably 2 to 4. The cross-sectional area of the rod may be a circle, oval, star, cross, square, or any other shape. Additionally, the rod may be straight, or may be twisted or curved.

FIGS. 9 and 10 are schematics of processes useable for the production of the abrasive grit according to certain embodiments of the invention. FIG. 9 shows first composition 31 and second composition 32, two separate and distinct dispersion streams, being fed into stratifying mixer 34. Mixer 34 has a first section 35 and a second section 36. A stratifying mixer typically has static mixing elements fixed in a conduit. The elements divide, invert, and radially mix material received from the preceding element with a programmed precision and efficiency. Two inlet streams become four alternating streams after the first element, either after the second element, and so on. The cross section of the resulting extrudate or off-stream 39, when viewed in the extrusion direction, shows alternating layers of first composition 31 and second composition 32.

Likewise, FIG. 10 shows first composition 41, second composition 42, and third composition 43, three separate and distinct dispersion streams, being fed into stratifying mixer 44. Mixer 44 has a first section 45 and a second section 46. The cross section of the resulting extrudate or off-stream 49, when viewed in the extrusion direction, shows alternating layers of composition 41, composition 42 and composition 43.

The co-extrusion or extrudate can be mixed, i.e., be passed through a mixer, such as a stratified mixer, to generate still further layers of any extruded materials. An example of this is provided hereinbelow, in connection with the examples. More generally, microstratefying mixtures produce controlled stratification in the extruded material, rather than random flow, Standard mixing elements fixed in a conduit divide, invert and radially mix materials received from the preceding element with a programmed precession and efficiency. For example, two inlet streams become four alternating streams after the first mixing element, eight after the second element and so on. Thus, the number of strata increases exponentially with the number of mixing elements. Microstratifiers, then, can be quite effective in generating a number of striations in the extruded product or extrudate, resulting from relatively few feeds through the extrusion dock.

Figure 11:
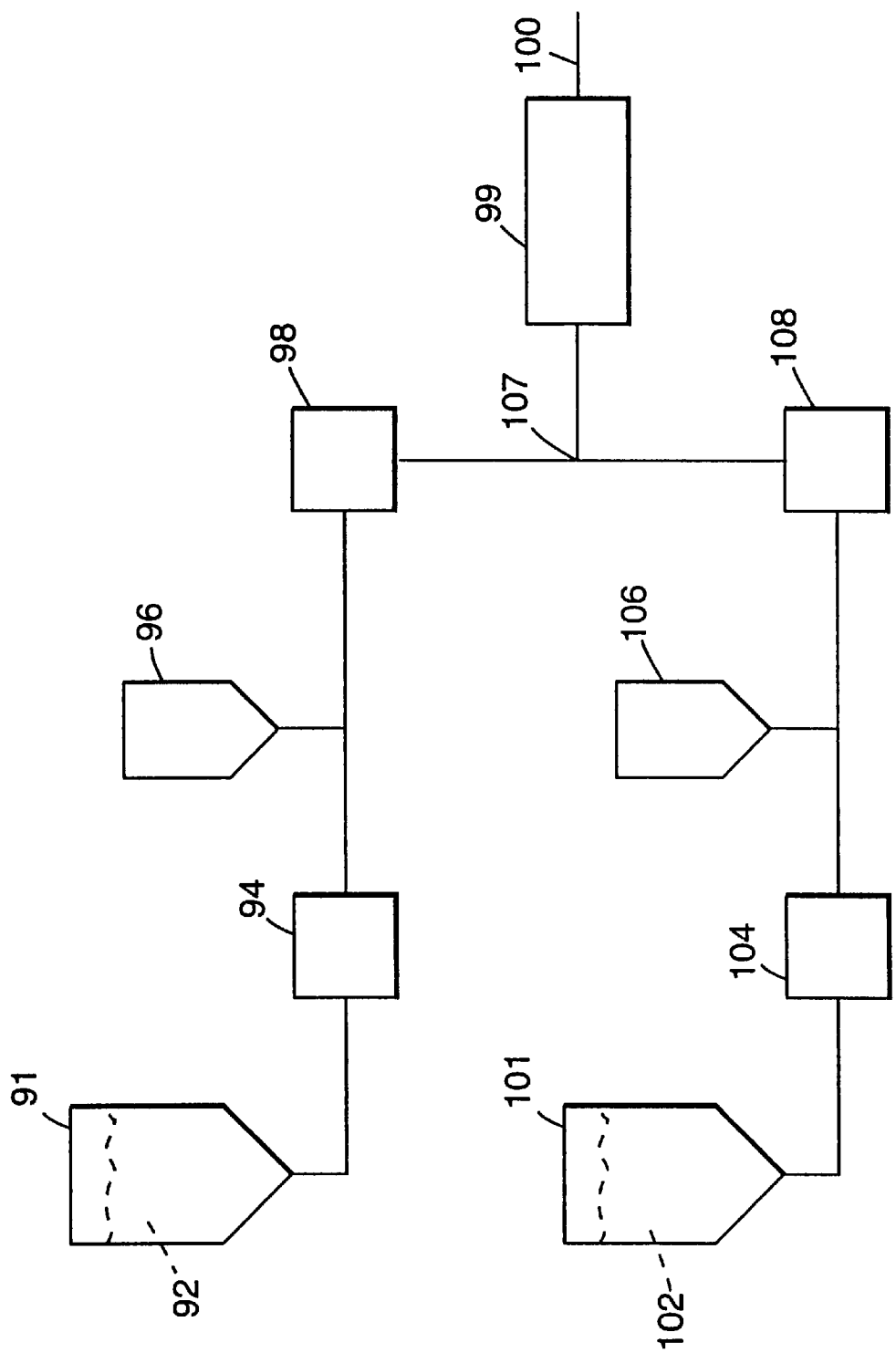
FIG. 11 is a schematic of a process for production of abrasive grits according to certain applications of the techniques of the present invention.

FIG. 11 is a schematic of an example of a process which can be used to produce the alumina abrasive grits of the present invention. Holding tanks 91 and 101, respectively, contain sol or gel 92 and 102, respectively. In one embodiment, sol or gel 92 and 102 are different from one another in some manner. Holding tanks 91 and 101 may have, for example, holding capacities anywhere from 5 liters to 50,000 liters, depending on the desired output from the process. Sols or gels 92 and 102 are pumped from holding tanks 91 and 101, respectively, by pumps 94 and 104, respectively. These pumps 94 and 104 are most preferably progressive cavity pumps because of their ability to handle liquid, gels and solids. Prior to being thoroughly mixed in pin mixers 98 and 108, gelling agent, stored in tank 96 and 106, can be added to the flow of sols or gels 92 and 102, respectively, to increase the sol or gel viscosity. A typical gelling agent is, for example, nitric acid. Once the sols or gels are at a preferred viscosity, they can then be combined into one feed stream at 107 and are stratified in static mixer 99. An extrudate or off-stream 100 from mixer 99 can then be dried and processed further as described below to produce alumina abrasive grits.

Follow-up Processing

In general, follow-up treatment of the co-extrusion or extrudate, whether mixed or not, can be conducted with standard techniques for use in sol processing to form abrasive grits. As indicated in such references as U.S Pat. Nos. 4,314,827; 4,881,951; 4,770,671; and 5,164,348, incorporated herein by reference, these techniques generally involve the steps of drying and firing (sintering), in some instances with separate steps of calcining (also known as prefiring) and/or impregnation. Before the material is fired or sintered it is converted, generally crushed, into particulate material. The term "converted" means that the nonsintered sintered or non-fired material is either cut, broken, crushed, or otherwise modified into the desired shaped or desired particle size distribution. The material can be sized and graded according to selected grades either before or after sintering.

Conventional crushing approaches which are useable include roll crushing, ball milling, and hammer milling.

Air drying steps may be used to remove water (or other volatiles) from the extrusion. Drying can be accomplished, for example, in a forced air oven at a temperature in the range of about 50° C. to about 200° C., preferably between about 100° C. and 150° C. Generally, drying is conducted until the dried gel contains 1 to 40%, preferably, 5 to 20% by weight, free-water.

The dried gel is typically calcined or pre-fired to remove any trace water or solvent. During calcining, the dried gel is generally heated to a temperature in the range from about 400° C. to about 1000° C., preferably about 400° to about 800° C. The dried gel is held within this temperature range until the free water and preferably over 90 percent by weight of any bound volatiles are removed. If the dried gel contains a modifier precursor, the dried gel is preferably calcined for a period of time sufficient to achieve essentially complete conversion of the modifier precursor to metal oxide.

Optionally, the dried or calcined material may be impregnated with modifier. General methods of impregnating particles derived from alumina hydrate dispersions are described, for example, in U.S. Pat. No. 5,164,348 (Wood), the disclosure of which is incorporated herein by reference.

In general, the calcined or dried material is porous. For example, calcined material generally has pores about 4 to 10 nanometers in diameter extending therein from an outer surface. Impregnation of the pores with an impregnation composition comprising appropriate modifier precursor and a liquid medium provides for increases in density and can improve toughness of the sintered alpha alumina-based particle. The modifier for impregnation (i.e., the impregnate) generally is a precursor of a metal oxide provided in the form of one or more salts of a metal (e.g., a nitrate or acetate salt). It is also within the scope of this invention to impregnate with an aluminum salt. The metal salt material is dissolved in a liquid medium, and the resulting solution is then mixed with the porous base particle material. The impregnation process is thought to occur through capillary action. The capillary action can be improved by subjecting the porous material to vacuum treatment before or during the impregnation step. U.S. application Ser. No. 08/781,557 (filed Jan. 9, 1997)(Wood) discloses subjecting calcined material to a vacuum just after impregnation. During the impregnation of large grits, e.g., greater than 400 micrometers, the calcined material cracks and splits due to the change in pressure, so as to provide sharp edges and points on the resulting abrasive particle. Such a technique can be applied with abrasive grits or particles prepared according to the techniques disclosed herein.

The liquid media used for the impregnating composition is preferably water (including deionized water) and/or an organic solvent (preferably a non-polar solvent). If the particulate material is calcined prior to the impregnation step, water is the preferred liquid media for the impregnation composition. If the particulate material is not calcined prior to the impregnation step, the liquid media preferred is one that will not dissolve or soften the particulate material.

The concentration of the salt in the liquid medium is typically in the range from about 5% to about 40% dissolved solids, on an oxide basis. In general, there should be at least 50 ml of solution added to achieve impregnation of 100 grams of porous base particle material, preferably, at least about 60 ml of solution to 100 grams of base particles and most preferably at least 70 ml of solution to 100 grams of the base particles. Examples of preferred impregnating solutions comprise salts of magnesium, neodymium, lanthanum, and yttrium.

In some instances, more than one impregnation step may be utilized. The same impregnation composition may be applied in repeated treatments, or subsequent impregnation compositions may contain different concentrations of the same salts, different salts, or different combinations of salts.

During heat treatment of the impregnated material to form the sintered, ceramic, alpha alumina-abrasive grits, the impregnate (or modifier) may react with alumina to form a reaction product. For example, the oxides of cobalt, nickel, zinc, and magnesium typically react with alumina to form a spinal structure. Yttria typically reacts with alumina to form $3Y_2O_3 \cdot 5Al_2O_3$, which has the garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula $LnMAl_{11}O_{19}$, wherein Ln is a trivalent metal ion such as La, Nd, Ce, Pr, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Such rare earth aluminates generally have exceptional properties in an abrasive grit and if present, are typically within the abrasive particle as a whisker(s) or platelet(s). Such whiskers or platelets typically have a length of about 0.5 micrometer to about 1 micrometer, and a thickness of about 0.5 micrometer or less. It is believed that the whiskers or platelets inhibit crack propagation. These whiskers or platelets are more likely to occur in the absence of a nucleating agent.

It would not be outside the scope of this patent to incorporate a hard particulate material such as a carbide, silicide, oxide, boride, nitride, oxycarbide, oxynitride, carbonitride or mixtures thereof into the layers of the α-alumina based precursor or precursors.

In one aspect of the invention, the abrasive grit consists essentially of metal oxides, a-alumina with other metal oxides. This abrasive grit will then be essentially free of non-oxides, i.e., the abrasive grit with less than about 0.1% non-oxides. These non-oxides are typically carbides, silicides, borides, nitrides, oxycarbides, oxynitrides, carbonitrides or mixtures thereof.

In another aspect of the invention, the abrasive grit can comprise a mixture of metal oxides with non-oxides. These non-oxides are typically carbides, suicides, borides, nitrides, oxycarbides, oxynitrides, carbonitrides or mixtures thereof.

Metal Oxide Surface Coatings (Optional)

It is within the scope of the present invention to provide alumina abrasive grits, as described above, which have the outer surface of the abrasive grit coated with a metal oxide. The metal oxide coating can be continuous or discontinuous, and be fairly dense with no porosity, or be porous. The thickness of the metal oxide coating is preferably in the range of about 0.05 to 20 micrometers, more preferably about 0.1 to 10 micrometers. Suitable metal oxides include, for example, oxide of titanium, zirconium, aluminum, chromium, vanadium, tantalum, hafnium, niobium, and combinations thereof For purposes of the present application, the term "metal oxide" is also intended to refer to silicon oxide. Various metal oxide coatings useful for this invention are described below, although the scope of this invention is not limited to these embodiments.

A coating of inorganic metal oxide particulates on the base particle provides a (sintered) abrasive particle having an increased surface area for improved adhesion to the bond system. Preferably, the particulate metal oxide coating on the sintered abrasive particle (or abrasive core) is relatively porous. Also, preferably, at least 70% (more preferably, at least 80%) of the surface area of the sintered alpha alumina-based particle (or core) is covered with the inorganic metal oxide particulate coating, although greater than 90% coverage may be obtained. With respect to the amount of coverage, reference is made to the amount of exposed sintered particle (core) surface in the resulting coated abrasive particle. Thus, "coverage of at least 70%" means that no more than about 30% of the total area of the underlying sintered base particle surface is exposed (i.e., not covered with particulates). The amount of coverage in this context is not meant to refer to the nature (e.g., porosity or density) of the particulate coating. The coating can be continuous or discontinuous.

The density of the metal oxide coating is typically less than 90% (preferably less than 80%) of theoretical. Most preferably, the coating has a density of at least 40%, but less than 70% of theoretical. This is not meant, however, to imply that the coating is discontinuous, but rather to reflect that pores extend therethrough. Further, the density value given is meant to refer to the average density of the coating, not the density of the individual fused particulates that make up the coating (i.e., the coating comprises dense particulates packed together with some open space therebetween).

During sintering, the inorganic metal oxide particulates in the coating typically sinter to one another resulting in a coating having good structural integrity. The resulting coating may contain more than one layer of inorganic metal oxide particulates. Typically, there are 2 to 30 layers, more typically, 3 to 20 layers of particulates. Preferably, at least 5 to 15 layers of inorganic metal oxide particulates are provided, stacked on one another.

The inorganic metal oxide particulates can comprise, for example, transitional alumina, alpha alumina, hydrated aluminas, yttria, magnesia, rare earth metal oxides, zinc oxide, iron oxide, silicates, chromium oxide, titanium oxide, nickel oxide, yttria, alumina, garnet, hexagonal rare earth aluminate, alumina-zirconia, zirconium oxide, alumina oxynitride, silicon aluminum oxynitride, silicon aluminum oxycarbide, and combinations thereof.

U.S. Pat. No. 5,011,508 (Wald et al.), the disclosure of which is incorporated herein by reference, describes autogenously bonding fine inorganic metal oxide (e.g., alumina) particulates to the surface of a base particle via mechanical impingement and then sintering to provide an abrasive particle having a particulate metal oxide coating.

A preferred metal oxide particulate surface coating is described in U.S. Pat. No. 5,213,591 (Celikkaya et al.), the disclosure of which is incorporated herein by reference, wherein an alpha alumina-based ceramic abrasive grit comprising an alpha alumina-based core having a coating of inorganic metal oxide particulates autogenously bonded thereto is described.

Other methods for providing other treatments and coatings of the abrasive grit known in the abrasive art (e.g., oxide coatings other than described above) may be useful in the preparation of abrasive grits or particles for use in the method according to the present invention. Examples of other metal oxide coatings are disclosed in U.S. Pat. No. 5,474,583 (Celikkaya). Examples of still other coatings, e.g., boride, nitride and carbide are disclosed in U.S. Pat. Nos. 5,611,828 (Celikkaya); 5,628,806 (Celikkaya et al.) and 5,641,330 (Celikkaya et al.). These latter coatings are typically applied to the grits after sintering or firing.

Sintering

As indicated above, the non-fired (or non-sintered) base particles or treated (e.g., impregnated, tumbled, and/or coated) base particles are precursors to ceramic abrasive grits.

The sintering or firing of the precursor abrasive grit can be accomplished through a variety of conventional processes. Typically, sintering is conducted at a temperature in the range from about 1200° C. to about 1650° C. Sintering generally can be accomplished within a time period of a few seconds to about 120 minutes, but generally it is done within 3 to 30 minutes. Sintering of various types of base particles is described, in general, in U.S. Pat. No. 4,314,827 (Leitheiser et al.), the disclosure of which is incorporated herein by reference. Another type of kiln useful for the sintering of the base particles, is described, for example, in U.S. Pat. 5,489,204, (Conwell et al.) the disclosure of which is incorporated herein by reference. The techniques of sintering applied therein may be applied to treated base particles as described herein. It is also within the scope of this invention to sinter in an inert or reducing atmosphere.

Abrasive Products

Abrasive grit according to the present invention and/or made according to the method of the present invention can be used in conventional abrasive products, such as coated abrasive products, bonded abrasive products (including grinding wheels, cutoff wheels, and honing stones), nonwoven abrasive products, and abrasive brushes. Typically, the abrasive products (i.e., abrasive articles) will include a binder and abrasive grit, at least a portion of which is abrasive grit made according to the present invention and/or made according to the method of the present invention secured within the abrasive product by the binder. Methods of making such abrasive products are well known. Furthermore, abrasive grit made according to the present invention and/or made according to the method of the present invention, can be used in abrasive applications that utilize slurries or abrading compounds (e.g., polishing compounds).

Figure 12:
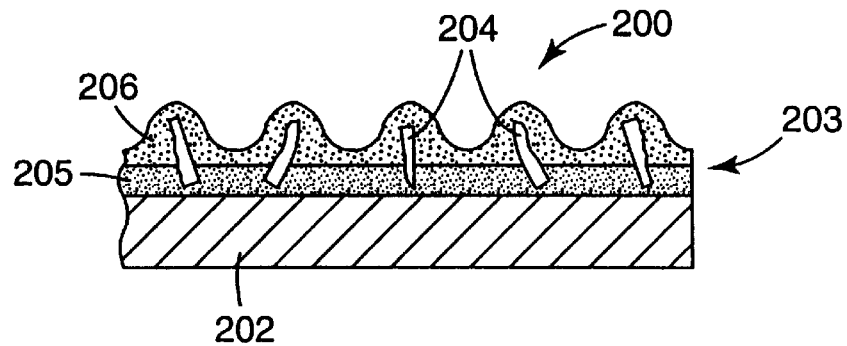
FIG. 12 is a schematic cross section view of a coated abrasive article incorporating abrasive grits according to certain applications of the present invention.

Coated abrasive products generally include a backing, abrasive grit, and at least one binder to hold the abrasive grit on the backing. FIG. 12 shows coated abrasive product 200 having backing 202 with abrasive coating 203. Abrasive coating 203 comprises a plurality of abrasive grits 204 embedded in make coat 205 and covered by make coat 206. The backing can be any suitable material, including cloth, polymeric film, fiber, nonwoven webs, paper, foams, sponges, combinations thereof, and treated versions thereof The binder can be any suitable binder, including an inorganic or organic binder. The abrasive grit can be present in one layer or in two layers of the coated abrasive product. Preferred methods of making coated abrasive products are described, for example, in U.S. Pat. Nos. 4,734,104 (Broberg); 5,316,812 (Stout et al.); 5,573,619 (Benedict et al.); and, 4,737,163 (Larkey), the disclosures of which are incorporated herein by reference.

The abrasive grits of the present invention can also be incorporated into structured abrasive products. Such abrasive products generally comprise a plurality of composites including binder and abrasive grits. The composites can be precisely shaped. Further information regarding such structures is found in: U.S. Pat. Nos. 5,152,917 (Pieper et al.) and 5,435,816 (Spurgeon et al.). The disclosures of the '917 and '816 patents are incorporated herein by reference.

The abrasive product can have an attachment construction on its back surface to secure the coated abrasive product to a support pad or backup pad. Such attachment constructions can be, for example, a pressure sensitive adhesive or one member of a hook and loop attachment such as disclosed, for example, in U.S. Pat. No. 5,505,747 (Chesley et al.). The back side of the coated abrasive product may optionally contain a slip resistant or frictional coating. Examples of such coatings include an inorganic particulate material (e.g., calcium carbonate or quartz) dispersed in an adhesive.

Figure 13:
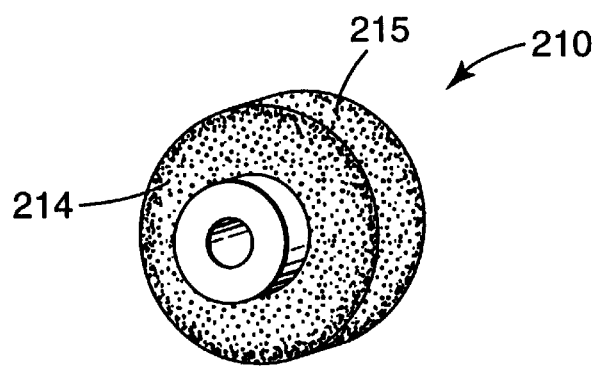
FIG. 13 is a schematic depiction of a bonded abrasive article incorporating abrasive grits according to certain applications of the present invention.

FIG. 13 shows bonded abrasive wheel 210 comprising abrasive grit 214 and binder 215. Bonded abrasive products typically include a shaped mass of abrasive grit held together by an organic, metallic, or vitrified binder. Such a shaped mass can be, for example, in the form of a wheel, such as a grinding wheel or a cutoff wheel. It can also be in the form, for example, of a honing stone or other conventional bonded abrasive shape. It is preferably in the form of a grinding wheel. For further details regarding bonded abrasive products, see, for example, U.S. Pat. No. 4,997,461 (Markhoff-Matheny et al.), the disclosure of which is incorporated herein by reference.

The vitreous binder may be fired at a temperature below 1200° C., sometimes below 1100° C., and sometimes even below 1000° C. The vitreous binder may comprise a frit vitreous binder.

Figure 14:
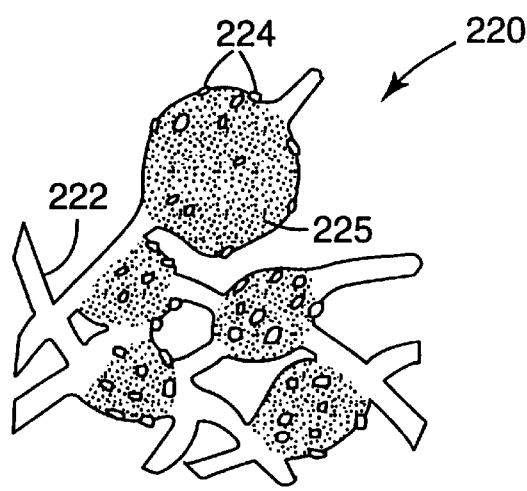
FIG. 14 is an enlarged schematic close-up view of a non-woven abrasive article incorporating abrasive grits according to certain applications of the present invention.

Nonwoven abrasive products typically include an open porous lofty polymer filament structure having abrasive grit bonded thereto and distributed throughout the structure and adherently bonded therein by an organic binder. FIG. 14 shows nonwoven abrasive article 220 comprising filaments 222 with abrasive grits 224 and binder 225. Examples of filaments include polyester fibers, polyamide fibers, and polyaramid fibers. For further details regarding nonwoven abrasive products, see, for example, U.S. Pat. No. 2,958,593 (Hoover et al.) and PCT Publication No. WO 97/07937, the disclosures of which are incorporated herein by reference.

The abrasive grits of the present invention may also be used in abrasive brushes and elements. Many examples of molded brushes are disclosed in PCT Publication No. WO 96/33638 and U.S. Pat. No. 5,679,067 (Johnson et al.), the disclosures of which are incorporated herein by reference.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha\beta$-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grit and/or the filler. In some systems the coupling agents can be used to modify viscosity and/or to improve mixing.

The binder can also contain filler materials or grinding aids, typically in the form of a particulate material. Typically, the particulate materials are inorganic materials. Examples of particulate materials that act as fillers include metal carbonates, silica, silicates, metal sulfates, and metal oxides. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; and graphite. A grinding aid is a material that has a significant effect on the chemical and physical processes of abrading, which results in improved performance. In a coated abrasive product, a grinding aid is typically used in the supersize coat applied over the surface of the abrasive grit, although it can also be added to the size coat. Typically, if desired, a grinding aid is used in an amount of about 50–300 $g/m^2$ (preferably, about 80–160 $g/m^2$) of coated abrasive product.

The abrasive products can contain 100% abrasive grit made according to the present invention and/or made according to the method of the present invention or they can contain a blend of such abrasive grit with conventional abrasive grit and/or diluent particles. However, at least about 15% by weight, and preferably about 50–100% by weight, of the abrasive grit in the abrasive products should be abrasive grit having layered structures according to the present invention and/or made according to the methods of the present invention. Examples of suitable conventional abrasive grit include diamond, cubic boron nitride, fused aluminum oxide, silicon carbide, garnet, fused alumina zirconia, and other sol-gel-derived abrasive grit. Examples of suitable diluent particles include marble, gypsum, flint, silica, iron oxide, aluminum silicate, glass, metal oxide bubbles, hollow clay spheres, porous clay pellets, solid or hollow glass spheres, expanded siliceous materials, hollow or solid resin spheres, and diluent agglomerates. Abrasive grit according to the present invention and/or made according to the method of the present invention can also be combined in or with abrasive agglomerates. Example of abrasive agglomerates are described in U.S. Pat. Nos. 4,311, 489 (Kressner), 4,652,275 (Bloecher et al.), and 4,799,939 (Bloecher et al.), the disclosures of which are incorporated herein by reference.

The following non-limiting examples will further illustrate the invention.

EXAMPLES

Sol I

Sol I was prepared by mixing 205 grams of boehmite (obtained under the trade designation "DISPERAL" from Condea Chemie of Hamburg, Germany) into 360 grams of acidified water (prepared by mixing 10 grams of concentrated (70%) nitric acid with 350 grams of deionized water) in a blender (obtained from Waring Products Division, Dynamics Corp. of America, New Hartford, Conn.) for about one minute.

Sol II

Sol II was prepared as described for Sol I, except that 195 grams of boehmite was used and 33 grams of zirconyl acetate (22% solids calculated as $ZrO_2$; obtained from Magnesium Elektron, Inc. of Flemington, N.J.) was added to the sol.

Sol III

Sol III was prepared as described for Sol I, except 30 grams of iron oxide aqueous dispersion (about 90 to 95% lepidicrocite; acicular particles with an average particle size of about 0.05 to 0.1 micrometer, a length to diameter or width ratio of about 4:1 to 6:1, and a surface area of about 115.3 $m^2/g$) having 5.1% iron oxide, calculated on a theoretical oxide basis as $Fe_2O_3$, were added to the acidified water prior to adding the boehmite.

Sol IV

Sol IV was prepared as described for Sol I, except 77 grams of a 20% colloidal zirconium acetate solution (obtained from Nyacol Products Inc., Ashland, Mass.) were also added to the sol.

Sol V

Sol V was prepared as described for Sol I, except 53 grams of iron oxide aqueous dispersion (about 90 to 95% lepidicrocite; acicular particles with an average particle size of about 0.05 to 0.1 micrometer, a length to diameter or width ratio of about 4:1 to 6:1, and a surface area of about 115.3 $m^2/g$), having 2.9% iron oxide calculated on a theoretical oxide basis as $Fe_2O_3$ were added to the acidified water prior to adding the boehmite, Sol VI Sol VI was prepared as described for Sol V, except 15 grams of a basic colloidal silica sol (obtained from Nyacol Products Inc. under the trade designation "Nyacol 215") were added to the sol (i.e., to Sol V).

Sol VII

Sol VII was prepared as described for Sol I, except 15 grams of a colloidal ceria acetate (obtained from Nyacol Products Inc.) were added to the sol (i.e., to Sol I).

Example 1 and Comparative Examples A and B

For Example 1, one chamber of each of four 50 ml dual chamber cartridges (obtained from Conprotec, Inc., Salem, N.H. under the trade designation "MIXPAC") were filled with Sol I. The remaining chambers were each filled with Sol II. For Comparative Example A, both chambers of each of four 50 ml dual chamber cartridges were filled with Sol I. For Comparative Example B, both chambers of each of four 50 ml dual chamber cartridges were filled with Sol II.

Each cartridge was capped, burped of air, and allowed to stand for three days. The twelve cartridges were placed in an oven at about 107° C. (225° F.) for two hours, and then cooled to room temperature.

The resulting gels were extruded from the respective cartridges into glass trays. Thus, each dual chamber cartridge was used to conduct a co-extrusion. More specifically, the gels were extruded through a static mixer nozzle (available under the trade designation "SCOTCH-WELD EPX MIXER NOZZLE" from the 3M, St. Paul, Minn.), having a tapered tip and ten mixing elements, to form rods that were approximately one millimeter in diameter. (The mixer nozzle had 20 mixing elements but was cut in half so only 10 mixing elements were used.) The rods were dried by placing them in an oven at about 107° C. (225° F.) for about one hour.

The dried rods were calcined for about 5 minutes at 650° C. in a stainless steel rotary kiln (dimensions 1.2 m long, 15 cm diameter, 0.3 m hot zone, tube inclined 2.4°, and rotating at 20 RPM), and then crushed to shorter lengths using a pulverizer (type U.A., manufactured by Braun Corp., Los Angeles, Calif.).

The crushed rods were impregnated with a rare earth nitrate solution at a ratio of 7 parts rare earth nitrate solution to 10 parts crushed rods by weight. The rare earth nitrate solution was prepared by mixing a lanthanum, neodymium, and yttrium nitrate solution (20.5% $La(NO_3)_3 \cdot 6H_2O$), 20.1% $Nd(NO_3)_3 \cdot 6H_2O$, and 26.1% $Y(NO_3)_3 \cdot 6H20$; available from Molycorp of Lourviers, Colo.) with a sufficient amount of magnesium nitrate solution (11% $Mg(NO_3)_3 \cdot 6H_2O$; available from Mallinckrodt Chemical of Paris, Ky.) and cobalt nitrate solution (15% $Co(NO_3)_2 \cdot 6H_2O$; available from Hall Chemical of Wickliffe, Ohio) to provide a solution containing about 5.8% $La(NO_3)_3 \cdot 6H_2O$, 5.8% $Nd(NO_3)_3 \cdot 6H_2O$, about 7.1% $Y(NO_3)_3 \cdot 6H_2O$, about 14.4% $Mg(NO_3)_2 \cdot 6H_2O$, about 0.4% $Co(NO_3)_2 \cdot 6H_2O$, and the balance deionized water.

The impregnated rods were dried, calcined at 650° C. in the stainless steel rotary kiln, and sintered for about 5 minutes at 1410° C. in a rotary kiln (dimensions 1.32 m long, 8.9 cm inner diameter, 31 cm hot zone) to provide sintered material.

The density of the sintered Example 1 and Comparative Examples A and B materials, as measured with a He pycnometer (Micromeritos AccuPyc 1440; Micromeritics Instrument Corp. Norcross, Ga.), were 3.95 $g/cm^3$, 3.97 $g/cm^3$, 3.91 $g/cm^3$, respectively.

The hardness of Example 1 and Comparative Examples A and B material were measured on cross-sections polished to 1 micrometer. The microhardness tester was obtained under the trade designation "MITUTOYO MVK-VL" from Mitutoyo Corp. of Tokyo, Japan. The measurement load was 500 grams. The average hardness of Example 1 and Comparative Examples A and B material (5 independent readings per sample (i.e., 5 different individual particles)) were 18.8 GPa, 18.9 GPa, and 18.9 GPa, respectively.

The sintered (rod) materials were broken to short lengths using a porcelain mortar and pestle. The length of the rods were approximately 3 to 5 times the rod width or/diameter. These broken rods were screened through a 25, 30, 35, and 40 mesh screen stack (USA Std. Testing Sieves). The rods retained on the 30 and 35 mesh screens were blended at a weight of 5.4 grams of −30+35 mesh material and 12.6 grams of −25+30 mesh material. This mixture, totaling 18 grams, was blended with 18 grams of ANSI grade 24 brown fused alumina (obtained from Washington Mills of North Grafton, Mass. and crushed and screened to the selected grade). These mineral blends were incorporated into coated abrasive discs (three discs of each lot, about 12 grams of mineral per disc) using conventional techniques, including electrostatic coating of the abrasive grit. The resins used to make the discs was a $CaCO_3$ make, cryolite size and $KBF_4$ supersize.

The coated abrasive discs were mounted on a beveled aluminum back-up pad, and used to grind the face of a 1.25 cm by 18 cm 304 stainless steel workpiece. The disk was driven at 5,500 rpm while the portion of the disc overlaying the beveled edge of the back-up pad contacted the workpiece at about a 6 kg load. Ten workpieces were ground per disc. Each disc was ground for ten minutes in one minute intervals using ten 304 stainless steel workpieces (i.e., one minute per workpiece). The average total cut for the Example 1 and Comparatives A and B coated abrasive discs were 135.1 grams, 111.2 grams, and 129.6 grams, respectively.

This example showed grinding performance improvement of the co-extruded Example 1 over the respective individual components (Comparative Examples A and B). It also demonstrated a zirconium could be incorporated using co-extrusion without significant migration into other phases. Thus, zirconia introduction could be efficiently achieved.

Example 2 and Comparative Examples C and D

Example 2 and Comparative Examples C and D were prepared as described for Example 1 and Comparative Examples A and B, respectively, except as follows. For Example 2, Sols I and III were used in place of Sols I and II. For Comparative Example D, Sol III was used in place of Sol II. Each capped and burped cartridge was allowed to stand for 7 days rather than 3 days. The extruded rods were dried in an oven at about 93° C. (200° F.) for about 2 hours, calcined at about 600° C., and sintered at about 1440° C. in the rotary kiln.

The densities of the Example 2 and Comparative Examples C and D sintered materials, as measured with the helium pycnometer, were 3.80 g/cm$^3$ 3.82 g/cm$^3$, and 4.01 g/cm$^3$, respectively.

The Comparative Examples C and D and Example 2 sintered materials, were sintered again in a box kiln (obtained under the trade designation "RAPID TEMP FURNACE" from C-M, Inc., Bloomfield, N.J.) at 1400° C. for 10 minutes. The densities of the "twice-sintered" Example 2 and Comparative Examples C and D materials, as measured with the helium pycnometer, were 3.86 g/cm$^3$, 3.85 g/cm$^3$ and 4.01 g/cm$^3$, respectively.

The "twice-sintered" (rod) materials were broken, screened, and incorporated into coated abrasive discs, and tested as described for Example 1 and Comparative Examples A and B. The average total cuts for the Example 2 and Comparative Examples C and D coated abrasive discs were 102.9 grams, 105.3 grams, and 91.4 grams, respectively.

From this example, it could be seen that an iron oxide nucleating agent could be incorporated into one phase of co-extruded phases without significant migration into the other phase. Thus, internal layering affects with different compositions one comprising iron oxide nucleating material, can be readily achieved.

Example 3 and Comparative Examples E and F

Example 3 and Comparative Examples E and F were prepared as described for Example 2 and Comparative Examples C and D, respectively, except as follows. The capped and burped cartridges were first under vacuum and then were allowed to stand 48 hours in air.

The gels were extruded into Pyrex trays through a 10 element static mixer non-tapered tip. The mixer was prepared by removing the tapered tip from a Scotch-Weld EPX mixer nozzle. The extruded material was dried in an oven at about 93° C. (200° F.). The dried material for each example was crushed into random shapes using a mortar and pestle, and screened to retain the −20+60 mesh (USA Std. Testing Sieves) material. Each screened material was calcined in the stainless steel rotary kiln at 650° C., impregnated, dried, calcined at 650° C., and sintered in a rapid temp. kiln for 30 minutes at 1430° C.

The density of the sintered Example 3 and Comparative Examples E and F abrasive grit materials, as measured using the helium pycnometer, were 3.96 g/cm$^3$ 3.89 g/cm$^3$, and 4.01 g/cm$^3$, respectively. The average microhardness of the Example 3 abrasive grit material was 20.3 GPa in the regions derived from Sol I, and 16.6 GPa in the regions derived from Sol III. The average microhardness of the Comparative Examples E and F abrasive grit materials were 18.3 GPa and 21.3 GPa, respectively.

Coated abrasive discs were prepared as described in Example 1 and Comparative Examples A and B and ground for ten minutes in two minute intervals on 304 stainless steel. The coated abrasive disc was attached to a 16.5 cm diameter, 1.57 mm thick hard, phenolic backup pad which was in turn mounted onto a 15.2 cm diameter steel flange. The mounted disc was rotated counterclockwise at 3550 rpm. The 1.8 mm peripheral edge of a 25 cm diameter 304 stainless steel disc (workpiece) deployed 7° from a position normal to the abrasive disc under a load of about 4 kg. The workpiece was weighed at the start of the test and at 2 minute intervals to determine the amount of stainless steel removed (i.e., abraded). The average total cut for the Example 3 and Comparative Examples E and F coated abrasive articles was 165.2 grams, 155.8 grams, 148.8 grams, respectively. This example shows a performance improved of a coated extrusion composition over the respective individual components (i.e., Comparative Examples E and F).

Examples 4 and 5, Illustrative Example I, and Comparative Example G

Examples 4 and 5, and Illustrative Example 1 were prepared as described for Example 2, except the filled cartridges were placed under vacuum to de-air the sols. For Example 4, the mixer tip was cut to 6 cm; for Example 5 to 9 cm; and for Illustrative Example I, to 12 cm. For Examples 4 and 5 and Illustrative Example I, the static mixers contained 10, 15, and 20 mixing elements, respectively.

More specifically, Example 4 was extruded through a 6 cm static mixer; Example 5 through a 9 cm static mixer; and Illustrative Example I, through a 12 cm static mixer.

Comparative Example G was prepared by gelling Sol I in a glass tray (i.e., there was no extrusion step) and then further processing it as described for Examples 4, 5, and Illustrative Example I. Examples 4 and 5, Illustrative Example I, and Comparative Example G were allowed to dry at 93° C. overnight in a forced air oven.

The Examples 4 and 5, Illustrative Example I, and Comparative Example G dried materials were each calcined at 650° C., crushed, and screened to retain −20+60 mesh (USA Standard Testing Sieves) material. Each of the screened lots was soaked in the rare earth oxide solution under vacuum and then filtered through a Buchner funnel to recover the impregnated material. After drying, the impregnated materials were each calcined at 650° C. in a prefire kiln, and then each sintered for 30 minutes using the box kiln ("RAPID TEMP") at 1430° C. (This impregnation step was of the type used in Example 1).

The Examples 4 and 5 calcined and sintered abrasive grit material were observed via light microscopy at 600× to each have distinct laminar microstructures composed of "nucleated" and "non-nucleated" regions. The laminate were much thinner and less distinct in Example 5 than in Example 4. Illustrative Example I appeared to be thoroughly mixed with only "nucleated" phase observed.

The average microhardness of the "nucleated" portions of the sintered Example 4 and 5, and Illustrative Example I materials were 19.5 GPa, 20.1 GPa, and 19.9 GPa, respectively. The average microhardness of the "non-nucleated" portions of the sintered Example 4 and 5 and Comparative Example G materials were 15.8 GPa, 16.4 GPa, and 18.2 GPa, respectively.

The average fracture toughness of the sintered Example 4 and 5, Illustrative Example I, and Comparative Example G materials were 3.0 MPa·m$^{1/2}$, 2.8 MPa·m$^{1/2}$, 2.7 MPam·m$^{1/2}$, and 2.5 MPam·m$^{1/2}$, respectively. The fracture toughness was calculated by measuring the crack lengths extending from the appeases from the Vikers indents made using a 1000 g load with a MITUTAYO MVK-VL hardness tester. Fracture toughness ($K_{1c}$) was calculated according to the equation: $(K_{1c})=FN/[(\pi c)^{3/2}\tan b]$ wherein b=68°, π=pi (3.14159), F=Newtons of Force on the indentor; c=½ crack length in meters. The density of the sintered Example 4 and 5, Illustrative Example I, and Comparative Example G materials were 3.92 g/cm$^3$, 3.94 g/cm$^3$, 3.99 g/cm$^3$, and 3.87 g/cm$^3$, respectively.

These examples show that the number of elements in the static mixer can influence the thickness of the layers.

Although not wanting to be bound by theory, it is believed that the improved fracture toughness may be due to the increased laminar character of the Example 4 and 5 materials. The improved fracture resistance due to the presence of a more porous (non-nucleated) laminar could be readily observed via scanning electron microscopy when examining the cracks measured to obtain fracture toughness values. Cracks were observed to terminate within the porous laminae or turn and propagate along the border between the seeded and non-seeded laminae.

Example 6 and Comparative Examples H and I

Example 6 and Comparative Examples H and I were prepared as described for Example 1 and Comparative Examples A and B, respectively, except as follows. For extrusion a 6 cm static mixer length was used. For Example 6, Sols I and IV were used in place of Sols I and II. For Comparative Example I Sol IV was used in place of Sol II for Comparative H, Sol I was used.

The density of the Example 6 and Comparative Example H and I abrasive grit materials were 3.97 g/cm$^3$, 3.91 g/cm$^3$, and 4.00 g/cm$^3$, respectively.

The average microhardness of the Example 6 and Comparative Example H and I abrasive grit materials were 19.4 GPa, 18.6 GPa, and 18.6 GPa, respectively. The average fracture toughness of the Example 6 and Comparative Example H and I abrasive grit materials were 3.0 MPa·$^{1/2}$, 3.3 MPa·m$^{1/2}$, and 3.3 MPa·m$^{1/2}$, respectively.

Example 6, Comparative Example H, and Comparative Example I abrasive grit were each coated onto fiber discs using the CaCO$_3$ filled make, cryolite filled size and KBF$_4$ filled supersize. Three discs for each example were evaluated on the Swing Arm Grinder using a flat test to grind stainless steel discs. The average grinding performance of the Example 6, Comparative Example H, and Comparative Example I coated abrasive articles were 108%, 100%, 110% of Comparative Example H, respectively.

Distinct laminar layers in the co-extruded material could not be detected by SEM or x-ray microanalysis, possibly due to the migration of zirconium during drying.

Example 7 and Comparative Examples J and K

Example 7 and Comparative Examples J and K abrasive grit materials were prepared as described for Example 1 and Comparative Examples A and B except as follows. For Example 7, Sols V and VI were used in place of Sols I and II. For Comparative Example J, Sol V was used in place of Sol I. For Comparative Example K, Sol VI was used in place of Sol II. Further, the calcined materials were not impregnated with the rare earth nitrate solution, and were sintered at 1430° C. in the rotary kiln.

For each of Example 7 and Comparative Examples J and K the sintered materials were screened and blended to provide, by weight, 8.4 grams −25+30 mesh, 5.7 grits −30+35 mesh, and 1.8 grams −35+40 mesh abrasive grit. The resulting mixtures were each blended with 21 grams of Grade 24 brown fused alumina (obtained from Washington Mills, and then roll crushed and screened). Each blend was used to make three coated abrasive discs having about 12.3 grams of abrasive grit on each disc. The resins used to make the discs were the CaCO$_3$ make and the cryolite size.

The discs were ground by a slide action grinder, with grinding for twenty one-minute intervals using 1018 mild steel workpiece, and the load was 6 kilograms (13 lbs.). The average total cut of the Example 7 and Comparative Examples J and K coated abrasive discs were 1005.4 grams, 1216.2 grams, and 973.4 grams, respectively. The average microhardness of the Example 7 and Comparative Examples J and K materials, based on measurements on cross-section of the rods, were 17.9 GPa, 19.6 GPa, and 17.8 GPa, respectively.

Example 8 and Comparative Examples L and M

Example 8 and Comparative Examples L and M abrasive grit were prepared as described for Example I and Comparative Examples A and B, respectively, except as follows. For Example 8, Sols I and VII were used in place of Sols I and II. For Example L, Sol I was used. For Comparative Example M, Sol VII was used in place of Sol II. Once calcined at 650° C., the rods were impregnated with the rare earth oxide solution, but were sintered at 1410° C. in the rotary kiln.

The average microhardness of cross-sections of the sintered Example 8 and Comparative Example L and M (rod) material were 17.8 GPa, 17.9 GPa and 17.0 GPa, respectively.

The sintered rods were crushed and screened as described in Example 1. Those rods retained on the 30 and 35 mesh screens were blended at a 50%/50% weight ratio of −30+35 mesh and −25+30 mesh material. The resulting −25+30/−30+35 mesh blend was mixed with an equal weight of ANSI grade 24 brown fused alumina obtained as described above. The blend was used to make four discs of each lot with each lot containing 12 grams of mineral per disc. The resins used to make the discs were the CaCO$_3$ make, cryolite size and KBF$_4$ supersize. The discs were ground as described in Example 7 and Comparative Examples J and K except grinding was for ten minutes at one minute intervals using 304 stainless steel workpieces, and the load was 6 kilograms (13 lbs.). The average total cut of the Example 8 and Comparative Example L and M coated abrasive discs were 165.4 grams, 159.2 grams, and 167.8 grams, respectively.

X-ray mapping indicated alternating Ce-rich layer. This example thus showed that ceria could be successfully incorporated by co-extrusion without significant migration into the other phase.

Illustrative Example 1 and Comparative Examples N and O

A 9.1% aluminum formoacetate (AFA) solution was prepared as outlined in by Richards, Goodbrake and Sowman,

*J. Am. Ceram. Soc.*, 74, [10] 2404–2409 (1991). The AFA solution was concentrated to 20.5% solids at 40° C. using a vacuum rotary evaporator. The concentrated AFA solution had a thick, syrup-like, consistency.

Illustrative Example 1 and Comparative Examples N and O were prepared as described in Example 1 and Comparative Examples A and B except as follows. For Illustrative Example 1, Sol III and the concentrated AFA were used in place of Sols I and II. For Comparative Example N, Sol III was used in place of Sol I. For Comparative Example O the concentrated AFA was used in place of Sol II. The filled cartridges were capped and allowed to stand upside down so that the air would work its way to the tip of the cartridges. After the filled cartridges were allowed to stand for one week cartridges the contents were extruded into rods as described before.

Upon drying, however, Comparative Example O rods disintegrated into a fine powder, and was therefore not further processed. With regard to Illustrative Example 1, when Sol III and the concentrated AFA were co-extruded, Sol III extruded out to resemble fine cottage cheese, while the AFA phase was runny and flowed. When the latter extruded material (i.e., the Sol III/AFA extruded material), a fine powder resulted, and was not further processed.

This example shows the importance that viscosity plays with respect to the co-extruded phases. If one phase, during co-extruding, is of relatively low viscosity and the other phase is of relatively high viscosity, the low viscosity phase will effectively flow around the high viscosity phase, during co-extrusion. What will likely result is that the high viscosity phase will form particles in the lower viscosity phase, providing a somewhat "cottage cheese" look. To avoid this, in general the phases should be formulated with relatively similar viscosities.

What is claimed is:

1. A ceramic abrasive grit comprising sintered, shaped, densified particles having at least three continuous and contiguous, stratified, alumina-based layers of at least two different phases.

2. The ceramic abrasive grit of claim 1 wherein at least one layer is seeded.

3. The ceramic abrasive grit of claim 2 wherein at least one layer contains an iron oxide seed or a precursor thereto.

4. The ceramic abrasive grit of claim 1 wherein at least one layer comprises zirconia.

5. The ceramic abrasive grit of claim 1 wherein at least one layer comprises ceria.

6. The ceramic abrasive grit of claim 1 wherein the grit further comprises modifiers.

7. The ceramic abrasive grit of claim 1 wherein the shaped particles are a random crushed shape.

8. The ceramic abrasive grit of claim 1 wherein the shaped particles are rod-shaped.

9. The ceramic abrasive grit of claim 1 wherein at least one layer has two measured dimensions of at least 70 microns.

10. The ceramic abrasive grit of claim 1 wherein at least one layer has two measured dimensions of at least 10 microns.

11. The ceramic abrasive grit of claim 1 wherein at least one layer extends at least 50% of a greatest dimension of width of the ceramic particle when viewed in at least one selected cross-section.

12. A coated abrasive article containing a ceramic abrasive grit according to claim 1.

13. A bonded abrasive article containing a ceramic abrasive grit according to claim 1.

14. A nonwoven abrasive article containing a ceramic abrasive grit according to claim 1.

15. An abrasive brush containing a ceramic abrasive grit according to claim 1.

* * * * *

UNITED STATES PATENT AND TRADEMARK OFFICE
CERTIFICATE OF CORRECTION

PATENT NO. : 6,080,216  
DATED : June 27, 2000  
INVENTOR(S) : Dwight D. Erickson Page 1 of 1

It is certified that error appears in the above-identified patent and that said Letters Patent is hereby corrected as shown below:

Column 2,
Line 35, "FIG. 13" should begin in a new paragraph

Column 19,
Line 18, After "thereof" insert -- . --

Column 21,
Line 54, "article 220" should read -- article 120 --

Column 27,
Line 8, "2.7 MPam.m$^y$" should read -- 2.7 MPa.m$^{1/2}$, --
Line 9, "2.5 MPam.m$^{1/2}$," should read -- 2.5 MPa.m$^{1/2}$ --
Line 49, "3.0 MPa.$^{1/2}$" should read -- 3.0 MPa..m$^{1/2}$," --

Column 29,
Line 15, delete "cartridges" after week

Signed and Sealed this

Twenty-fifth Day of September, 2001

Attest:

*Nicholas P. Godici*

NICHOLAS P. GODICI  
*Attesting Officer*   *Acting Director of the United States Patent and Trademark Office*